Patented Jan. 30, 1951

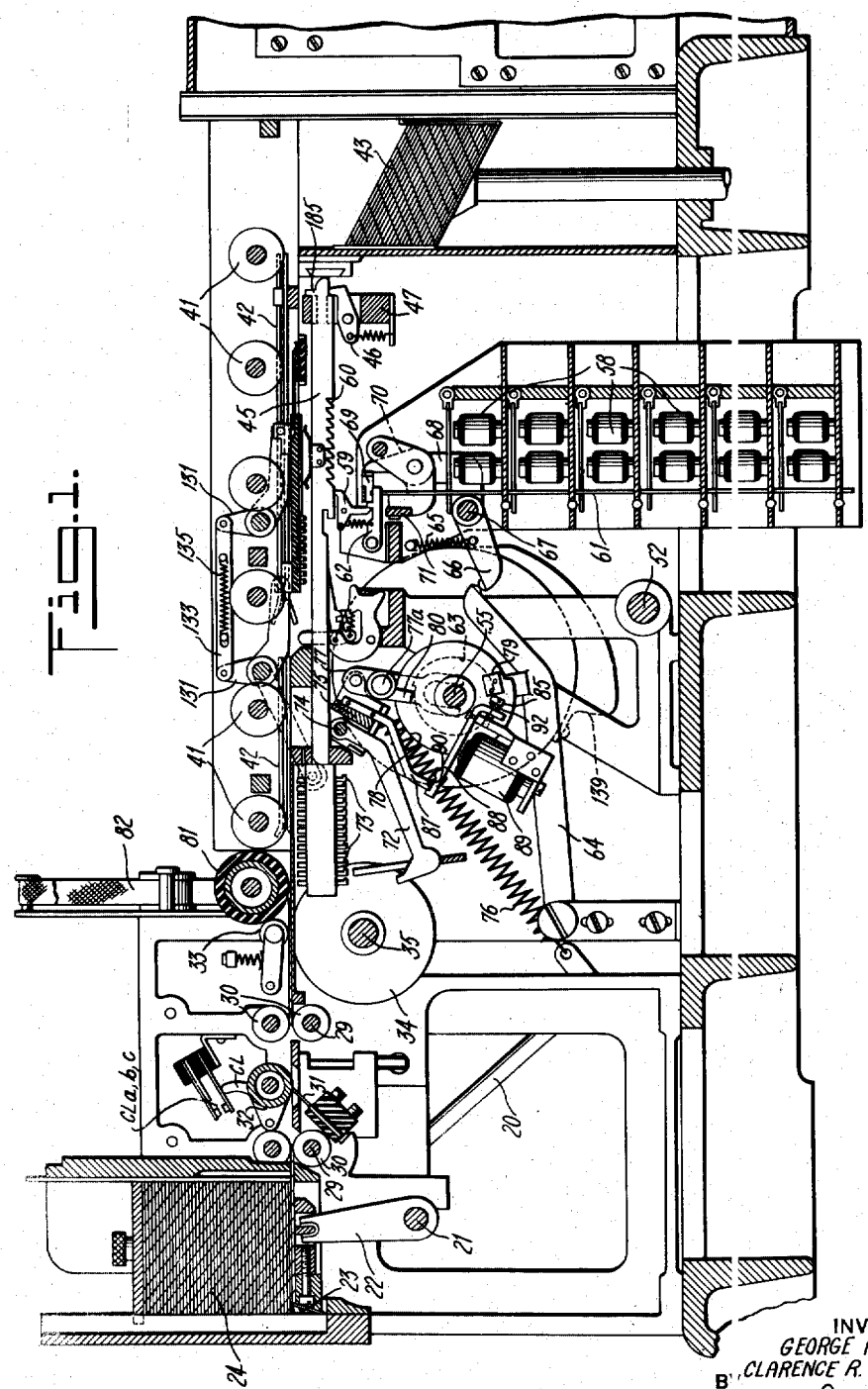

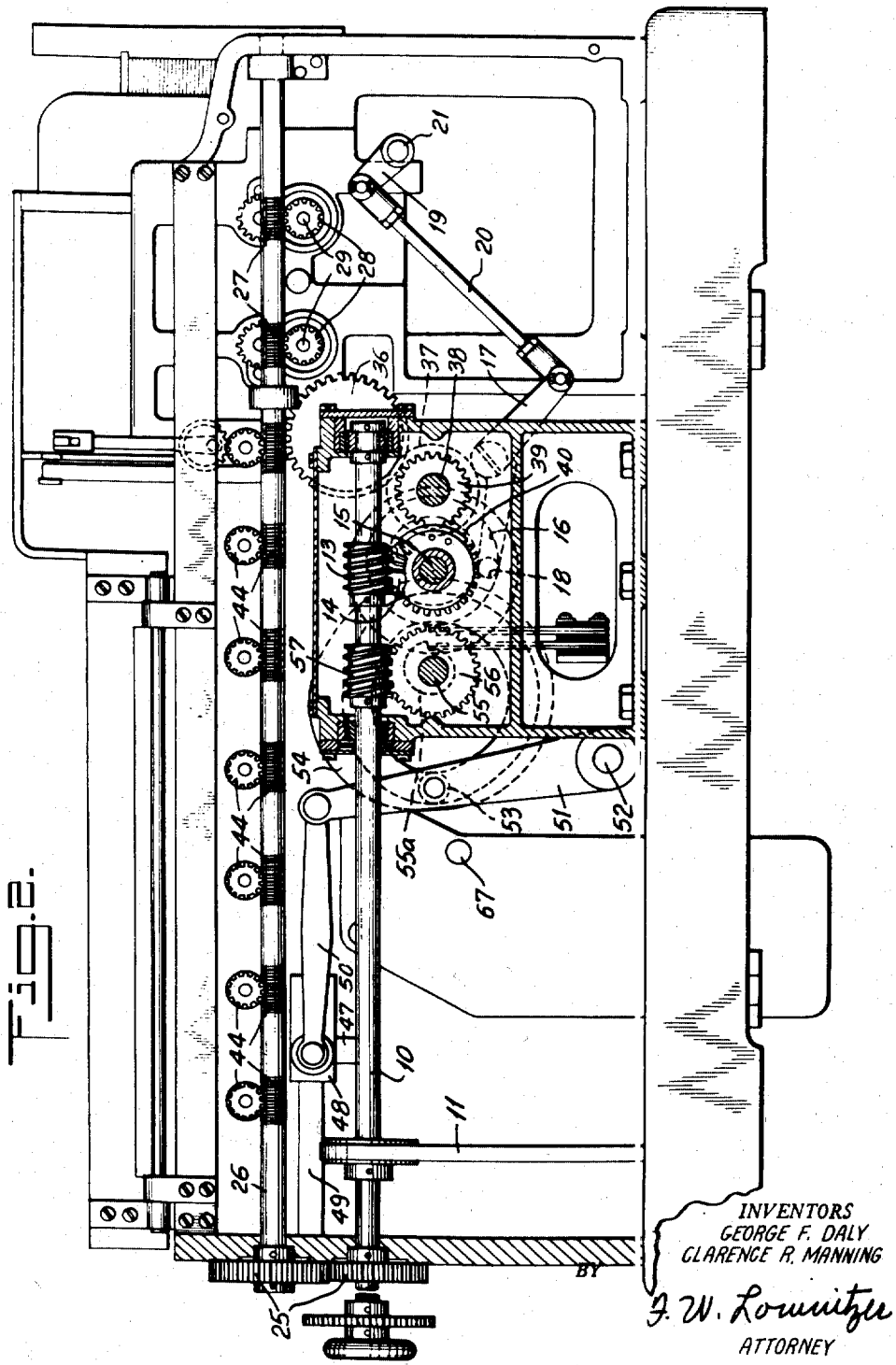

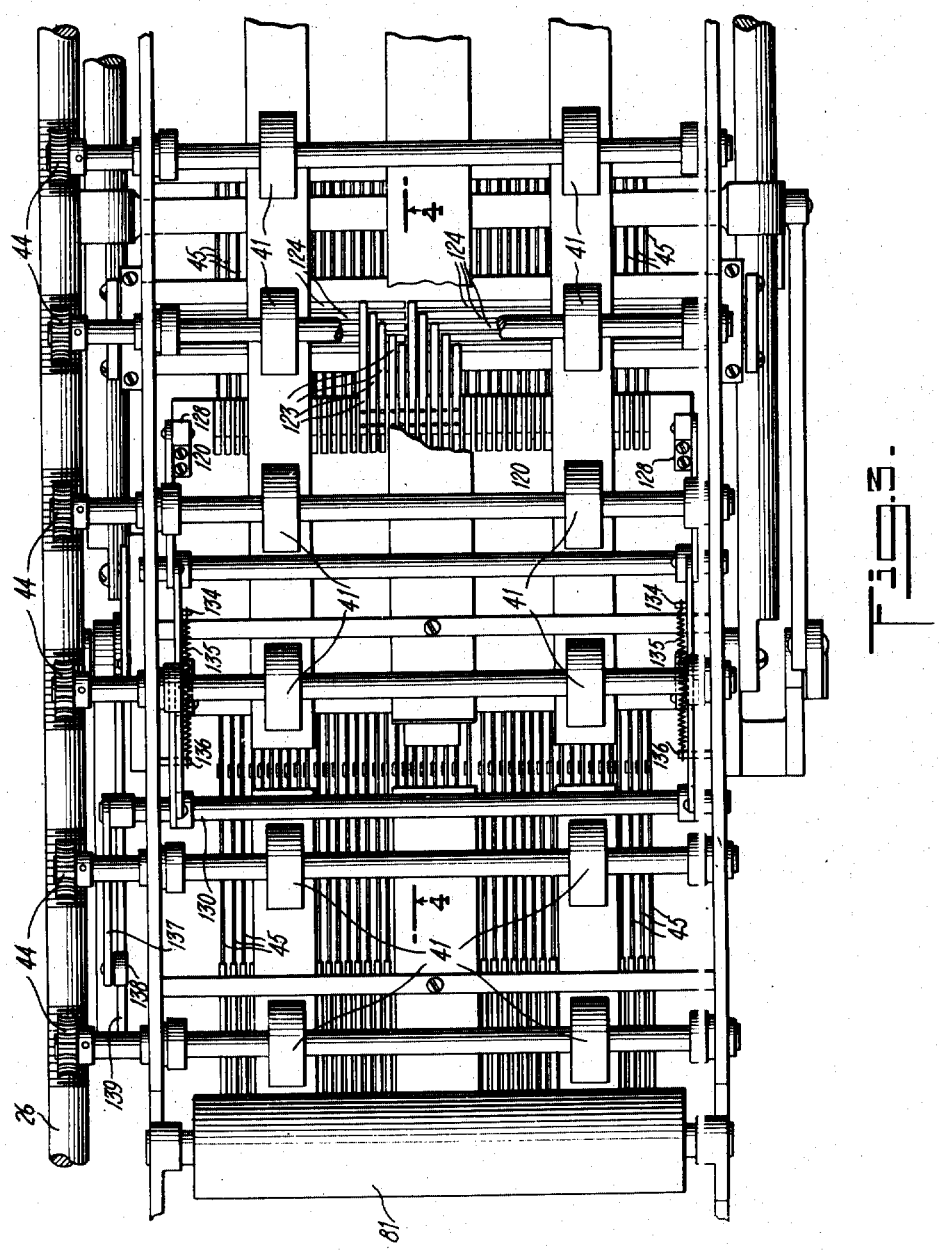

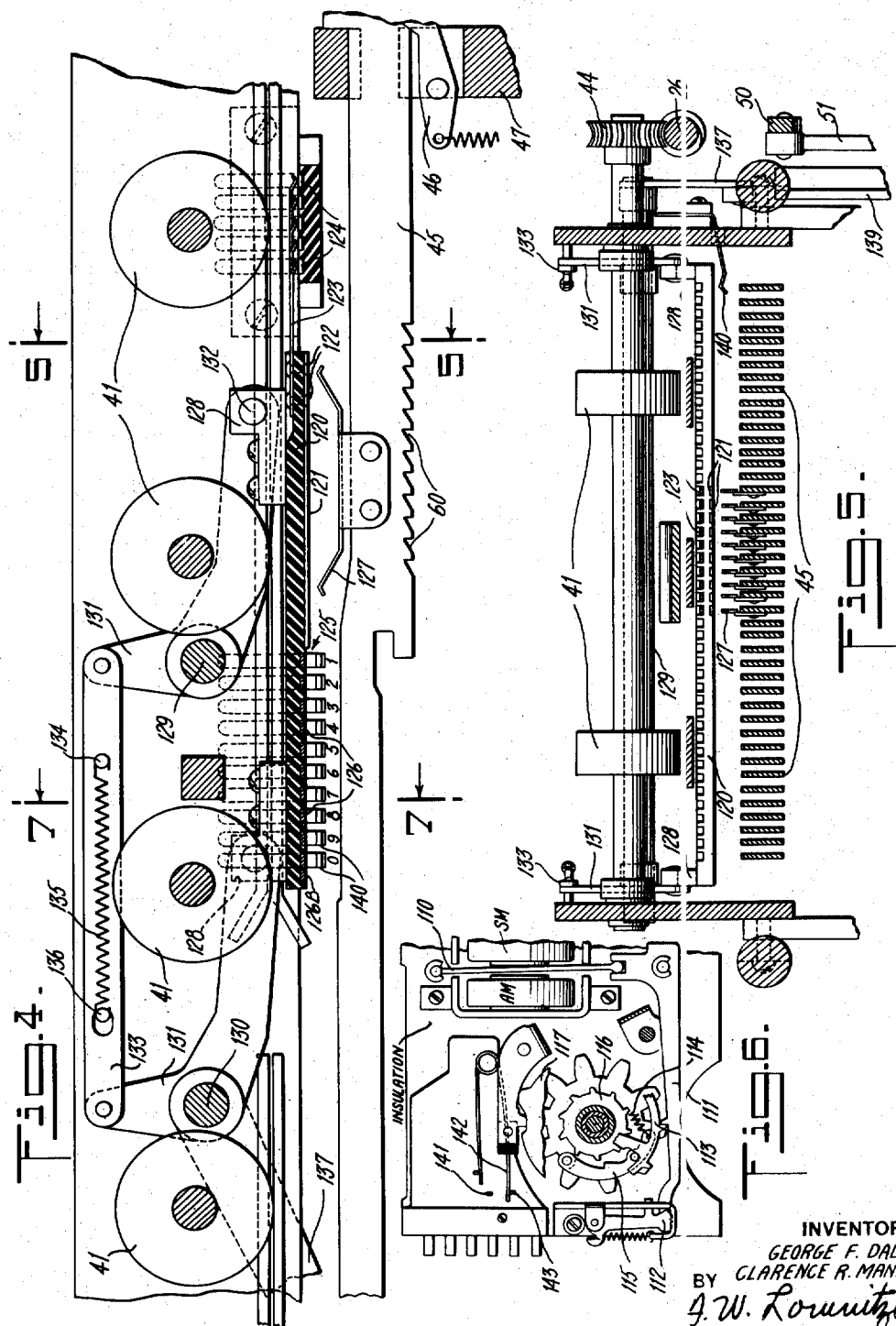

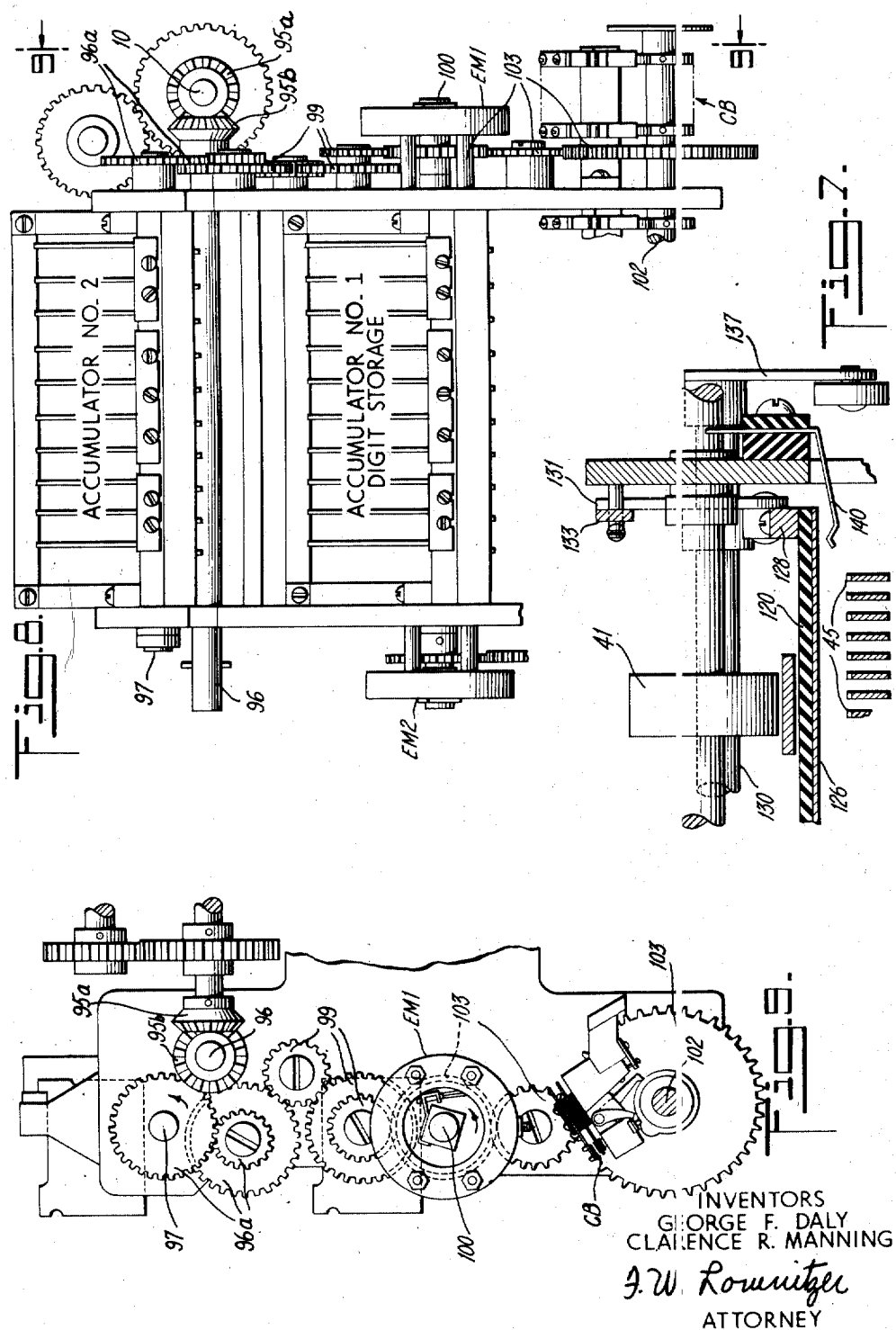

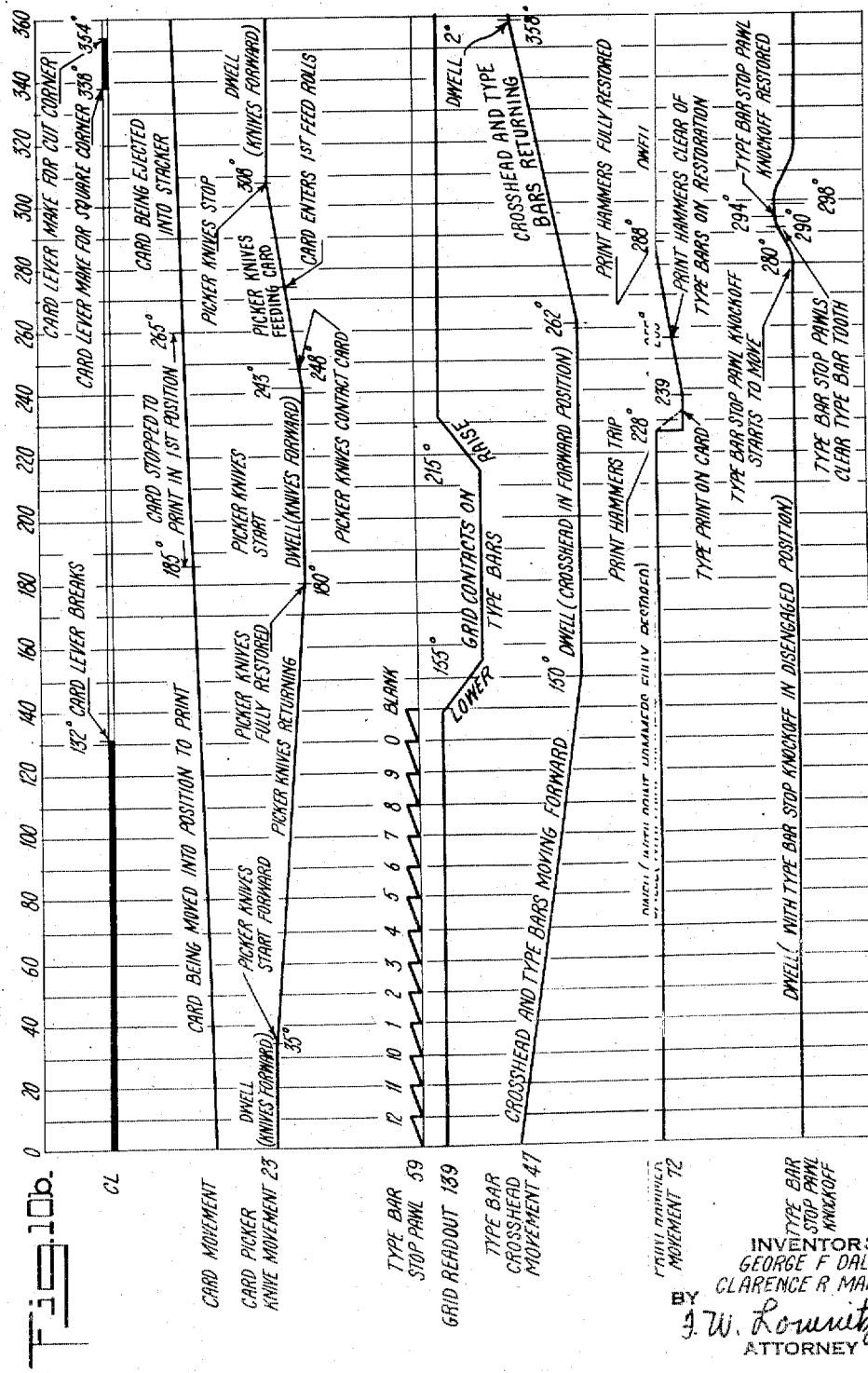

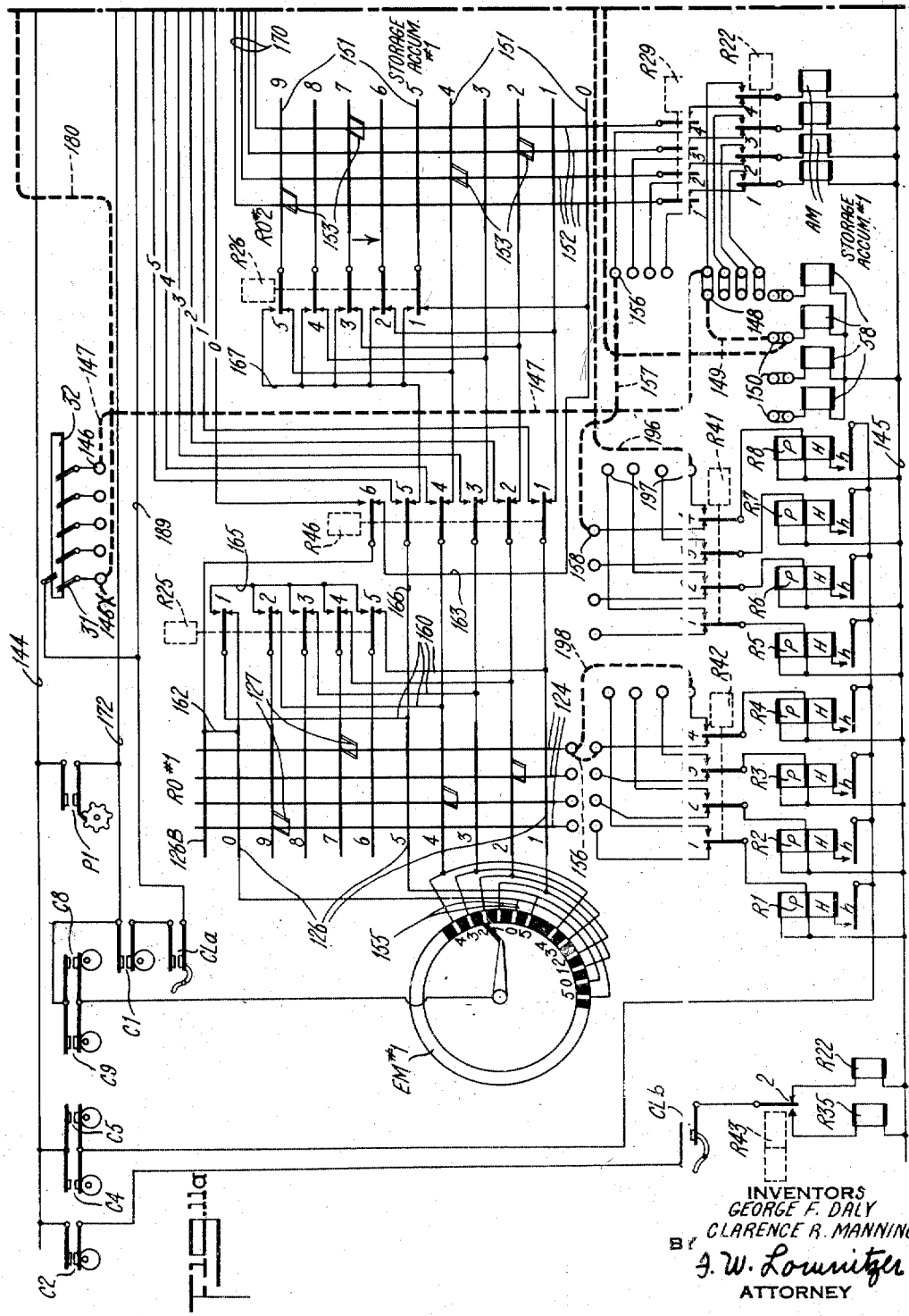

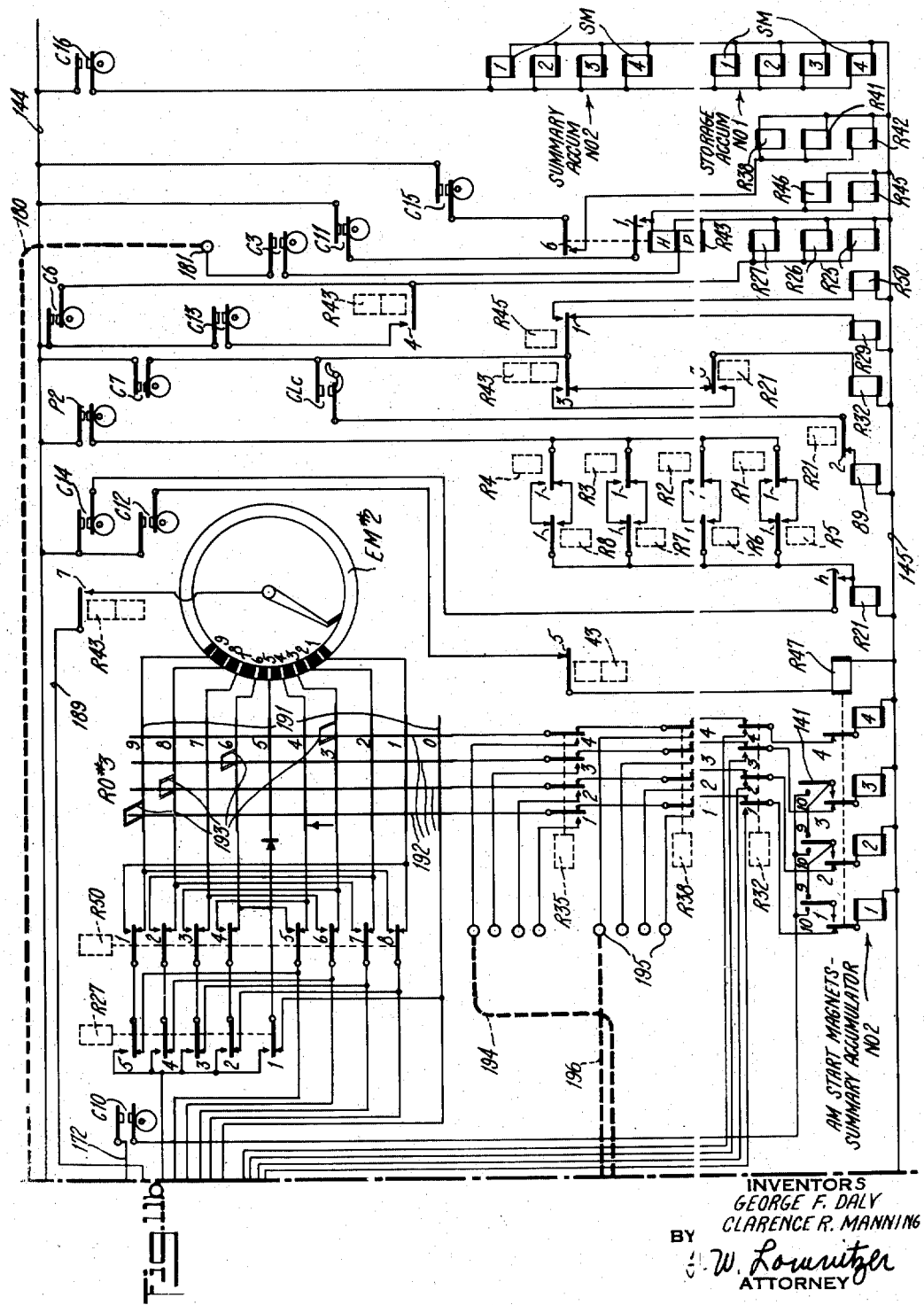

2,540,026

UNITED STATES PATENT OFFICE 2,540,026

RECORD CONTROLLED PRINTING MACHINE WITH CHECKING DEVICE TO CONTROL ACCUMULATOR ENTRIES

George F. Daly, Endicott, and Clarence R. Manning, Vestal, N. Y., assignors to International Business Machines Corporation, New York, N. Y., a corporation of New York Application June 29, 1949, Serial No. 101,930

13 Claims. (Cl. 235—61.9)

This invention relates to record controlled machines and more particularly to the class which is capable of sensing perforated records and interpreting the meaning of the perforations for controlling the operation of a printing mechanism to print the amounts represented by the perforations on a suitable recording medium, such as a paper strip or the records themselves. The present improvements comprise means for establishing and determining the correct setting of the printing mechanism and only when such has been determined causing the entry of the amounts in the accumulator mechanism and printing the amount. A still further improvement comprises means for establishing and determining the correct setting of a printing mechanism under control of an accumulator and when such has been detected printing the amount.

Machines of this general type have been utilized for printing on the perforated records to form checks issued for the payment of some monetary transaction. Machines of this type have been found to be highly accurate in their operation when used commercially, nevertheless any single instance of improper printing resulting from maladjustments of the parts, dirt, or dust, change in adjustment of parts should be guarded against, however rare its occurrence.

The present machine finds a most desirable and useful application in the preparation of checks, vouchers, bills, etc. However, before the preparation of such checks by the instant machine it is common practice commercially to determine in advance by means, other than the present type of machine, the total amount to be disbursed. This total of all checks is known as the "control total." It is, therefore, preferable that when the instant machine is utilized to prepare payroll checks that it issue only printed checks which are correct in their individual amounts, as well as their totals. Of course, any incorrect setting of the type bars would result in printing the improper amount on the check. Accordingly, one feature of the invention in a broad sense, is to provide for the determination of the accuracy of the setting of the type bars and when an accurate setting has been detected to enter each amount into an accumulator. Obviously, if all type bar settings were found to be accurate the accumulated total in the machine should correspond to the precomputed "control total." This comparison can be made by visual comparison of the amount on a reading accumulator with the precomputed total amount, but according to the invention the present machine provides for the printing of the total under control of the accumulator after the last check to be printed has passed through the machine. If all of the card checks have been properly printed, this total should agree with the precomputed "control total."

According to the invention a series of records are passed through the machine, which are perforated to represent individual amounts known to add up to a precomputed "control total." Such records pass through an analyzing mechanism and under control of said analyzing mechanism set up both the type bars and an amount storage means, compare the representations set up on the type bars with the amount storage means and when correspondence or agreement has been determined print such amount, effect the entry of the amount, preferably under control of the amount storage means, into a summary accumulator; and when a run of perforated cards has passed through the machine automatically condition the machine so that a total will be taken from the summary accumulator and printed so as to enable a comparison with the precomputed "control total."

Also according to this invention is the provision of means which automatically operates upon detection of a disagreement between the setting of the type bars and the amount storage means to prevent the printing and accumulating of the amounts on the cards and passing such cards through the machine so that an omission of printing will indicate that during the passage of this card there has been an improper setting of the type bars.

In connection with some of the individual features the invention also consists in the provision of a record controlled printing mechanism, such as type bars which are set up under control of an analyzing mechanism and a digit storage means which is also set up independently of the type bars and a comparing means for determining whether both are set at corresponding digit positions to effect an entry into an accumulator under control of the digit storage means. Stated, in other words, according to the invention, a digit storage means is provided which functions first as a checking device for type bars and then functions again as a means for effecting an entry into an accumulator.

An outstanding advantage resulting from the suppression of the printing and accumulating operation is that all cards correlated with an improper setting of the type bars are passed uninterruptedly through the machine, enabling a run of cards to pass through the machine without stoppage of the machine. This is of particular advantage over machines of similar development where improper operations of the machine, whatever they were, were indicated by a complete stoppage of the machine. This mode of operation required the operator to be continually at attendance so that when the machine stopped the reason therefor had to be determined and the machine restarted in operation. If the operator was not at attendance, this resulted in idle machine operations, resulting in the diminished output of the machine. In the present machine, as previously stated, cards comprising each run are passed through uninterruptedly and the machine is only stopped when the run has been terminated.

As stated earlier the machine is automatically conditioned to take a total from the accumulator upon passage of a total taking control card, and to further insure accurate type bar setups, the total on the accumulator is also compared with the type bar setup. If they agree the total is printed and the accumulator reset. If they disagree then the total will not be printed and the accumulator will not be reset, and never until an agreement has been detected. This additional improvement also constitutes a feature of the invention of a relatively high importance.

The invention also consists in an improvement in the comparing means coordinated with the type bars and the storage means, and the type bars and the accumulator. Previously, comparing operations for the ten digits required a corresponding number of ten successive impulses. In the present arrangement a comparison of ten digits can be effected by only six comparing impulses. This is preferably carried out by comparing, during transmission of each of the first five test impulses, one pair of digits for each impulse. These digits consist of one group of 1 to 5 and a second group of 6 to 0, and a pair of digits comprises one from each group, such as 1—6, 2—7, 3—8, 4—9, 5—0. To further determine whether there is a brush setting in the two compared orders in identical groups, the last test impulses is utilized. Upon a digital basis this last impulse is known as the 5 component impulse and is utilized to finally detect incorrect brush settings of two compared devices in the same order which has previously been accepted as correct. The result of this mode of operation is that by means of this added impulse every significant digit can be compared by the utilization of only six impulses.

This particular mode of operation is also applicable to make entries into an accumulator under control of a readout by the means of digital impulses 1, 2, 3, 4 and 5. Entry of the digits 1, 2, 3 and 4 alone and such digits in combination with 5, or the entry of the digit 5 alone enables the entry of digits 1 to 9 with the minimum of five electrical impulses. Entries according to such mode of operation can be either for the purpose of entering the true number amount into the accumulator or entering the complement of such amount to reset an accumulator.

It is obvious, therefore, that the incorporation of this mode of operation for comparison purposes in the basic machine to which the present invention is preferably incorporated enables all the necessary operations to be effected in a machine cycle of the same length as heretofore, thus avoiding the necessity of increasing the time of a cycle of machine operation and corresponding reduction in its output.

Other objects of the invention will be pointed out in the following description and claims and illustrated in the accompanying drawings, which disclose, by way of example, the principle of the invention and the best mode, which has been contemplated, of applying that principle.

In the drawings:

Fig. 1 is a central sectional view of the machine in which the present invention is preferably incorporated.

Fig. 2 is a side elevational view, partly in section, taken at one side of the machine.

Fig. 3 is a plan view of the basic machine.

Fig. 4 is a detail view showing a contact wiper of the grid type readout which is differentially positioned by the stopping of a type bar. The view also shows the operating connections for reciprocating the grid assembly to make electrical contacts with the contact wipers.

Fig. 5 is a sectional view taken on the line 5—5 of Fig. 4.

Fig. 6 is a view showing one order of an accumulator of a form preferably employed in connection with the present invention.

Fig. 7 is a sectional view which is fragmentary and is taken on the line 7—7 of Fig. 4.

Fig. 8 is a side elevation view showing the driving mechanism for the accumulators, the impulse emitters and cam contacts.

Fig. 9 is an end view taken on the line 9—9 of Fig. 8.

Figs. 10a and 10b represent a timing diagram.

Figure 10A:
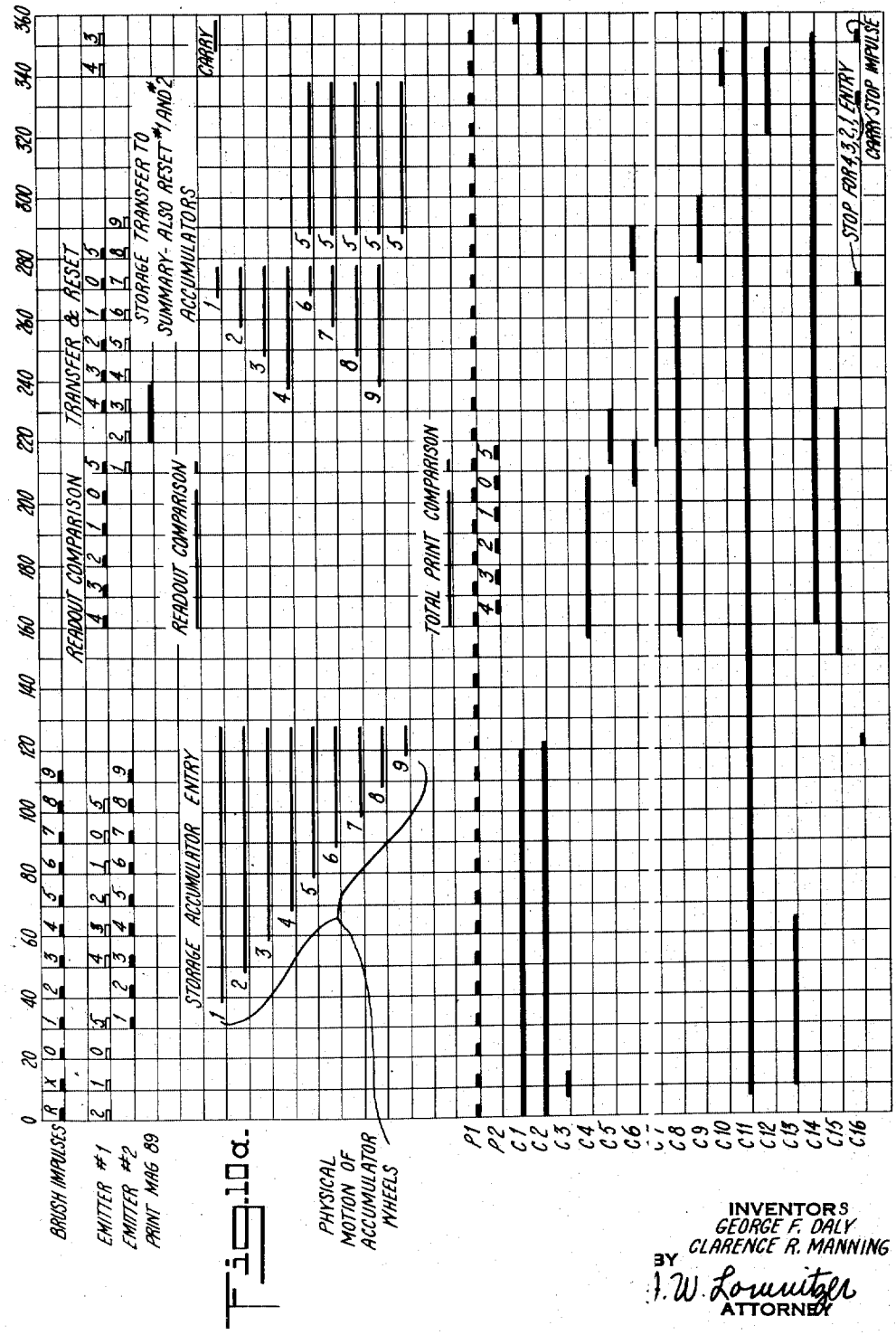

Figs. 11a and 11b when joined together in the named order comprise a wiring diagram of the machine.

The present invention is incorporated in a machine which is shown in complete detail in the patents to G. F. Daly, No. 1,946,900 and R. E. Page, No. 2,019,869 to which reference may be had for an understanding of the details of construction of the illustrative machine.

CARD FEEDING MECHANISM

In more detail 10 (Fig. 2) represents the main drive shaft of the machine. This may be driven in any suitable manner as by an electric motor through belt 11 rotating a pulley attached to shaft 10.

From shaft 10 a worm 13 (Fig. 2) drives worm wheel 14 secured to a shaft 15 to which is also secured a box cam 16. A pivoted cam follower arm 17 has a roller 18 at one end riding in the cam groove and at the other has a connection to an arm 19 through adjustable pitman 20.

Arm 19 is secured to a shaft 21 having arms 22 (see Fig. 1) in pin and slot engagement with a card picker 23 mounted for reciprocation in the frame of the machine. This reciprocating picker mechanism is adapted to advance one record card at a time from the supply stack or magazine 24.

Through gears 25 shown in Fig. 2, shaft 16 drives a parallel shaft 26 which has threaded worm sections 27 meshing with worm gears 28 secured to feed roller shafts 29 to drive feed rollers 30 (Fig. 1) constantly. The card which is advanced by the picker 23 passes into the bite of the first pair of feed rollers 30 to the left in Fig. 1 and is subsequently guided to the analyzing or perforation reading devices which comprise brushes 31 and a contact roller 32. These brushes and contact roller are of conventional structure such as is commonly used in electrically controlled tabulating machines.

After passing the analyzing brushes 31 each card passes to the second pair of feed rollers 30 which advance said card to a pair of intermittently driven rollers comprising upper spring-pressed rollers 33 and lower rollers 34 which engage the edge of the card. These rollers 33 and 34 advance the card to printing position at which time they momentarily pause in their rotation to stop the feeding of the card to permit printing on the card in accordance with the preceding analysis.

This interruption in the advance of the card is accomplished as follows: Rollers 34 are secured to a shaft 35 (Fig. 1) journaled in the frame of the machine and having attached at one end a gear 36 (Fig. 2) meshing with a gear 37 on shaft 38 on which shaft is also a gear 39 adapted to be driven by a mutilated gear 40 mounted on the continuously rotated shaft 15.

Thus, during the rotation of shaft 15 the gear 40 will pick up gear 39 to advance each card to printing position, whereupon, at this time, the toothless portion of gear 40 moves into locking engagement with gear 39. After printing has been effected, gear 39 is again engaged for rotation and the card is fed forward to a conveying means (Fig. 1) comprising rollers 41 and tracks 42 which convey the card to a suitable stacker 43. The shafts upon which rollers 41 are secured are adapted to be continually driven by the gear connections 44 (Figs. 2 and 3) to the shaft 26.

It should be mentioned that a conventional type of card lever CL (Fig. 1) is arranged between the sets of rollers 30 for closing card lever contacts CLa, CLb, etc. This card lever is operated by each card to close the series of contacts which are aside of each other.

PRINTING MECHANISM

For effecting the printing on the record cards as they successively pass through the machine, a plurality of type bars 45 (Fig. 1) is provided. All of these bars are mounted for reciprocation in the frame of the machine and each has a connection through a spring-pressed pawl 46 (Fig. 4) to a crosshead 47 which causes each type bar to move with the crosshead in its leftward movement. Thus, in Fig. 1, upon movement of crosshead 47 to the left, the pawls 46, through frictional engagement with bars 45 will move the type bars concurrently in the same direction.

The bars may be arrested at any point in their travel, and subsequently the pawl 46 will disengage from, and permit the further movement of the crosshead 47. Upon the reverse movement of crosshead 47 the shoulders 185 (Fig. 1) of the bars 45 will be engaged thereby to positively move the bars to restored position. For reciprocating the crosshead 47 the following mechanism is provided.

As shown in Fig. 2 the crosshead 47 is connected at its ends to blocks 48 slidable upon rods 49 and having pivoted link connections 50 to a follower arm 51 pivoted at 52. Arm 51 has a roller 53 cooperating with the cam groove of a box cam 54 mounted on a shaft 55 connected through worm gear 56 and worm 57 to the constantly running shaft 16. The arrangement and timing of the parts is such that the type bars 45 are advanced synchronously with the movement of a card past the analyzing or sensing brushes 31.

If a perforation at, say, the "5" position on the card is under the sensing brushes, the corresponding type representing "5" will be at the printing line. The establishment of an electric circuit through the index point perforations by the brush sensing one column is adapted by circuits to be described to energize a magnet 58 (Fig. 1).

There are a number of these magnets 58, each magnet being related to a corresponding type bar 45 and card column. The energization of any magnet is adapted to release a pawl device 59 through a wire 61 and latch 62 and allow it to engage one of the ratchet teeth 60 on the bar 45. After pawl 59 has engaged the teeth 60, further movement of the type bar 45 to the left in Fig. 1 is prevented. As stated, the type bars 45 are positioned during a passage of a card past the brushes and subsequently these type bars are held during the period that a card passes from the analyzing station to printing position and during the printing operation. After the printing operation, pawls 59 and latches 62 are positively restored in the following manner:

Secured to shaft 55 is a cam 63 (Fig. 1) which cooperates with and actuates a follower arm 64 pressed upwardly by a spring 65 acting through an arm 66 on shaft 67. The shaft 67 has secured thereto arms 68 which carry a restoring plate 69. Arms 70 pivoted to arms 68 carry a restoring plate 71. By this construction cam 63 is adapted to move plate 69 to the left to restore pawls 59 and plate 71 is moved upwardly to restore latches 62 and their connected wires 61.

The printing operation about to be described is under the control of a print magnet 89 which will be explained later on.

For each type bar 45 there is an individual hammer 72 which is adapted to strike the particular type 73 positioned at the printing line on the type bar. The hammers are pivotally mounted on a rod 74 carried by a bar 75 and depend for their actuation upon movement of said bar. The bar 75 is pivoted on the frame of the machine by pintles coaxial with rod 74 and has springs 76 connected thereto for biasing the bar in a clockwise direction in Fig. 1.

To the middle of bar 75 there is pivoted a cam follower arm 77 bifurcated to straddle shaft 55 and having a roller 77a in cooperation with a cam 78. Fixed to one face of the cam 78 is a cam member 79 which cooperates with a projection 80 of the cam follower arm 77.

As the cam 78 revolves, by virtue of the shaft 55 being driven in the manner previously described, it cooperates with the arm 77 through its follower roller 77a, gradually retracting the hammers 72 in a counterclockwise direction against the tension of springs 76.

As the roller 77a leaves the high point of the cam 78 member 79 will underlie the projection 80 and upon continued rotation of the cam the projection 80 drops off the member 79 and the springs 76, thus released, turn the common bar 75 in a clockwise to swing the hammers 72 against type 73, thus effecting printing.

By circuits to be described later, a timed impulse, conditionally established by the congruity of digit values in the two digit storage means, energizes the control magnet 89, previously mentioned, which causes armature 88 to be attracted. The attraction of the armature allows an arm latch 87, secured to common bar 75, to disengage from armature latch surface 90. It is this unlatching operation that permits the common bar 75 to rotate clockwise, in the manner previously explained, to swing the hammers 72 against the type 73. Spring 92, confined on one end by stop 85, returns armature 88 to its original position when the magnet 89 becomes deenergized.

Referring to Fig. 1, 81 designates a printing platen journaled in the frame of the machine and adapted to be rotated by frictional engagement with the passing card to prevent excessive wear at any one place. The inking ribbon devices are of conventional form and require no detailed description, the ribbon 82 being guided along the platen 81 and beneath the tabulating card.

In the event that digit values set up in the type bars the storage unit set thereby and the storage unit set up under control of the analyzing devices do not conform, the timed impulse previously mentioned is suppressed, thus printing for the particular cycle will be suppressed and is explained in the following manner: The suppression of the timed impulse prevents energization of magnet 89. Thus, armature 88 remains in engagement at surface 90 with latch arm 87 which prevents further cooperation between follower roller 77a and cam 78 as the high point of the cam passes by the follower roller. For the same reason cooperation is suppressed between cam member 80 and block 79; thus common bar 75 will not displace hammers 72 for the particular cycle.

CAM CONTACTS

Referring to Figs. 8 and 9 the continually running shaft 10 carries a bevel gear 95a meshing with a bevel gear 95b secured to a shaft 96. Shaft 96 drives shaft 97 through gears 96a. Shaft 97 carries gears which are similar to gears 18 of the Lake patent, No. 2,328,653 for driving accumulator elements of No. 2 accumulator. From idler gears 96a there is a gear driving train 99 to a shaft 100 which is the main accumulator drive shaft for No. 1 accumulator which is used as a digit storage means. Drive shaft 100 drives the rotatable brush elements of two emitters EM1 and EM2.

Shafts 97 and 100 rotate twice per machine cycle, as storage accumulator No. 1 is set up early in the machine cycle and resets later in the same cycle. A similar drive is used for accumulator No. 2 which functions on the second revolution only for entry receiving or reset. From each end of drive shaft 100 there is a gear drive train 103 to a shaft 102 which carries cams for operating the series of "C" cam contacts, and the "P" cam contacts which are shown in the wiring diagram. Shaft 102 rotates once per machine cycle.

GRID TYPE READOUT

It is desirable to include in the machine a grid type of digit readout by means of which the different digital positions of the type bars can be represented and stored up for comparison with the digital positions of a supplemental accumulator type of digit storage means. Both of these storage means are concurrently set up under control of the same card analyzing devices which control the differential position of the type bars. The arrangement now to be described is best shown in Figs. 3, 4, 5 and 7.

To exemplify the invention, ten orders of the type bars have an associated grid type of readout but by means of a duplication of the arrangement now to be described all the type bars may be so provided. Mounted over the type bars is an insulating plate 120 which is rectangular in formation, as shown in Fig. 3. Embedded in said plate 120 there is, for each type bar 45 which is to have an associated digit readout, a current conducting strip 121 which is parallel with type bar 45. There are ten of such strips 121, which are shown in Figs. 4 and 5. By means of rivets 122 (see Fig. 4) a contact spring 123 has an electrical connection with the related current conducting strip 121. The five contact fingers 123 in each group are of successive different lengths (see Fig. 3) so that each spring contact finger 123 makes an electrical contact with a related column bar 124. Since there are ten contact strips 121 there is a corresponding number of column bars 124.

As best shown in Fig. 4 the contact strips 121 terminate at 125 so as not to initially make contact with the first one of a series of digit contact bars 126 also carried by the insulating plate 120 and which are positioned transversely of the strips 121. There are ten of these digit bars 126 designated digitally in order 1, 2 . . . 8, 9 and 0. Each type bar 45 which is to have an associated digit readout carries insulated therefrom a contact finger 127 which is so positioned that the left end of such finger, shown in Fig. 4, will make successive contact with the digit bars 126 and selectively in accordance with the digit position that the type bar 45 has been moved to the left. The right extremity of the contact finger 127 will have a continuous electrical contact with the related column bar 121, but only when said plate 120 is depressed from the normal position shown in Fig. 4.

A feature of the construction and arrangement of the grid type readout is that during the setting of the type bars 45 the grid type readout assembly carried by the plate 120 is normally elevated so that the fingers 127 will not, either during their differential setting or restoration, wipe over either the strips 121 or the digit bars 126. This will avoid the objection of placing a frictional resistance upon the type bars 45 which would have to be overcome in their differential setting and restoration if continued electrical contact was maintained.

To this end cam operated means is provided to normally retain the plate 120 out of contacting position with the fingers 127 and depress said plate 120 to make the desired contact during the readout of the digit representations, said cam means moving the grid readout assembly upward out of contacting relationship when the type bars 45 are to be restored.

The insulating plate 120 carries at each of its four corners a bracket 128 which are shown in Figs. 3, 4 and 5. Secured to rock shafts 129 and 130 are four bell cranks 131. The horizontal arm of each of said bell cranks is pivotally connected by a pin 132 to the related bracket 128. The upper vertical arms of the two bell cranks 131 on each side of the machine are interconnected by a link 133, the above arrangement providing a parallelogram structure for raising and lowering the grid assembly by rocking of the shaft 130 by cam means to be described. Each link 133 carries a pin 134 to which is connected one end of a spring 135, the other end thereof being attached to a fixed stud 136 carried by the related side frame of the machine and which extends through an elongated slot in the related link 133. The normal tension in springs 135 will retain the grid assembly 121 in the normal position shown in Fig. 4.

Secured to the rock shaft 130 is a depending follower arm 137 carrying a roller 138 in the plane of an operating cam 139 which, as shown in Fig. 1, is carried by the drive shaft 55. The cam formation is such that the plate 120 and parts carried thereby are depressed so that contact fingers 127 have an electrical contact with the digit bars 126 depending upon the digit position of type bar 45.

The spring fingers 123 (Fig. 4) are so resilient that both in the normal and depressed position of the grid assembly electrical contact is made with the related column strips 124 as is evident in Fig. 4. However, with respect to the digit bars 126, each is out of electrical contact with the related contact finger 140 as shown in Fig. 7 but when said assembly is depressed the desired electrical contact is made between each of the ten digit bars 126 and the related contact finger 140. As will be explained in connection with the wiring diagram digital impulses are transmitted to some of the above designated digit bars 126 through contact fingers 140 so that in accordance with the differential position of the wipers 127 differentially timed digit representing impulses will be selected and transmitted to an electrical device of the comparing means.

ACCUMULATORS

It is preferable to utilize the type of accumulator fully shown and described in Patent No. 2,328,653, issued to C. D. Lake et al., granted September 7, 1943, to receive the values represented upon a card, but only if certain conditions have been detected. This is accumulator No. 2 (see Fig. 8). The other accumulator No. 1 is used merely as a digit storage means so that its conventional readout can be compared with the grid type of readout set up by the type bars.

Fig. 6 shows one order of this form of accumulator, either No. 1 or No. 2 which is similar to that in the designated patent but shown herein modified to include necessary changes which will be later explained. Since the detailed construction and operation of this accumulator is fully set forth in the patent, a brief description will suffice.

The pivoted armature 110 which is normally between the cores of the advance magnet AM and the stop magnet SM but against the SM magnet has at its free end a connection to a clutch lever 111. In the declutched position of the clutch lever 111 shown in Fig. 6 the armature 110 is biased against the core of the SM magnet. Whenever the AM magnet is energized the armature 110 will take an alternative position, rocking the clutch lever 111 to a clutching position, the clutch lever 111 being held in either clutching or declutching position by a resilient latch member 112.

A feature of the construction of the accumulating unit is that the armature 110 will remain biased by latch member 112 against the AM or SM magnet that last attracted it.

Clutch lever 111 is shown in declutching position and when moved to a clutching position it releases a disk 113 for counterclockwise movement and a spring 114 is now effective to rock clutch pawl 115 into engagement with a constantly rotating ratchet wheel 116. As a result of this clutching operation an accumulator element 117 is initiated into rotation. The termination of the rotation of the accumulator element is effected as a result of the energization of the SM stop magnet after entering an item, entering complements of values to reset an accumulator, and also at the end of a units carry operation by an electrical carry circuit, which would be the case for accumulator No. 2. In any case energization of magnet SM will rock the clutch lever 111 to declutching position.

It should be noted that the arm 50 carrying knockoff pins 52 and 53 in the aforesaid Lake Patent No. 2,328,653 is not used in the present machine since clutch arm 21 of said patent (or arm 111 herein) is restored herein by the AM and SM magnets. However, restoring pin 80 of said patent is used and because the gear 18 of said patent is secured to the two revolution per cycle shaft 97 of accumulator No. 2 herein the carry lever restoring pin 80 of said patent will contact the carry latches twice per cycle. The first contact, occurring about 20° of the cycle, is the only effective one, since the second, at about 200° has no effect because the wheels of accumulator No. 2 will not have been rotated to a new setting at this time.

The accumulator drive shafts 97 and 100 (Fig. 8) for accumulators No. 2 and No. 1 correspond to shaft 19 of the aforementioned Patent No. 2,328,653. From Fig 8 it will be recalled that a bevel gear 95a carried by the main drive shaft 19 drives a train of gears including 96a secured to the aforementioned drive shaft 97. This constitutes in the present machine the driving means for the accumulator wheels and other parts of the accumulator No. 1, which herein is used as a digit storage means. The gear drive for the accumulator drive shaft 100 was previously explained. Accumulator No. 2 is utilized to accumulate amounts represented on the cards.

Associated with each accumulator order is an electrical readout which is of a form well known in the art. In general, the readout for each order consists of a brush rotatable by the accumulator element to make contact with a conducting segment and individual digit representing segments. Details of construction of one form of such readout can be found in the patent to C. D. Lake et al., No. 2,232,006. In the wiring diagram the accumulator readouts are generally designated RO, there being two, RO2 and RO3.

WIRING DIAGRAM

The operation of the machine will now be described in connection with the wiring diagram. When the machine is started in operation by starting circuits which are well known and fully shown and described in the patent to G. F. Daly, No. 1,946,900, cards are fed successively from the magazine through the machine and, as has been described, the passage of each card will close the card lever contacts CLa, CLb and CLc.

1. *Type bar setting control circuits*

The circuit for energizing the type bar stopping magnets 58 is from the line side 144, through well known circuit breaker contacts P1 (Fig. 11a), cam contacts C1 which are closed during the analysis of all the perforations in the order R, X, 0–9, CLa card lever contacts closed during the analysis of the card perforations, contact roller 32, brushes 31 of the columns to be printed, a plug socket 146, plug connection 147, a plug socket 148, plug connection 149, plug socket 150, type bar stopping magnet 58, to the line side 145. By the differentially timed impulses transmitted under control of the card reading brushes 31 magnets 58 are energized at differential times and the type bars are set at the desired digit printing positions. About one cycle point after the magnet is energized the stopping pawl 59 (Fig. 1) is released to stop the type bar which will remain in its digit position corresponding to the card hole of the related column.

In order to simplify the wiring diagram only four denominational orders and the plugging for only one order are shown but in actual practice there will be more denominational orders according to the desired capacity of the machine. It is also explained that if a column is blank no impulse is transmitted to the magnet 58 and such type bar travels to its extreme left-hand position in Fig. 1 but will not present any type to the printing platen 81. In such case contact finger 127 contacts with digit bar 126B (Fig. 4). The machine also includes a conventional zero elimination mechanism which enables the insertion of printed zeros to the right of the digits 1-9 of the highest denominational order and suppress those at the left and such arrangement is shown and described in the patent to Ralph E. Page, No. 2,019,869. Of course, the contact fingers 127 (Fig. 4) take commensurate digital positions so as to make contact with the desired digit bar 126 in order that the grid type readout will represent and store up therein the amount represented on the card.

2. *Circuits for setting storage accumulator No. 1 to represent and store up representation of amount on the card*

In order to store up the amount derived from the card in storage accumulator No. 1 for subsequent comparison with the amount set up on the grid type readout the impulse circuit just described is extended to the AM start magnets of accumulator No. 1.

At the termination of the preceding cycle cam contacts C2 (Fig. 11a) close at 340° and remain closed during the next cycle until about 122°, thereby closing a circuit from the line side 144 through C2 cam contacts, CLb card lever contacts, R43—2 contacts now normal, R22 relay coil to line side 145. R22 relay coil transfers its 1, 2, 3 and 4 contacts so that during the transmission of impulses to plug sockets 148, said impulses are directed by wires through the now transferred 1—4 relay contacts of R22, to the AM or start magnets of the No. 1 storage accumulator. Transmission of differentially timed impulses to such magnets will initiate rotation of each accumulator wheel to a digit position which is the tens complement of the digit punched in the card.

It will be noted that the entry of the tens complement of the amount on the card is just the reverse of the true number digit entry which is usually made in the accumulator wheels of an accounting machine. This tens complement entry is effected because the card in the present machine is passed through the analyzing mechanism in the order of the index points R, X, 0, 1-9. For example, a differentially timed impulse derived from the card hole at the 7 position will cause the wheel to go a distance of three steps. The termination of the digit entry in each order is effected by the transmission of a stop impulse at 120° to the SM stop magnet and currently for all orders. The circuit for transmitting such stop impulse is line side 144, C16 cam contacts, concurrently to the SM stop magnets of all orders, line side 145. SM stop magnets declutch the accumulator elements and the storage accumulator No. 1 now represents the tens complement of each digit. Transmission of the 0 impulse to AM magnet is coincident with the stop impulse to SM stop magnet and, as is well known in the form of accumulator herein utilized, the accumulator element remains at normal position, which would be 0 in this machine, due to the previous accumulator clearing operation.

In the assumed example the card represents -9427- and thus -1683- is entered into the storage accumulator No. 1.

Associated with the storage accumulator No. 1 is a readout RO2 which is of the conventional construction and comprises digit bars 151 designated 1-9 and 0. The column bars 152 comprise, in the simplified wiring diagram herein, four in number. Contact between digit bar 151 corresponding to the digit position of the accumulator wheel and the column bar 152 is effected by the customary brushes 153 which are rotated by the accumulator wheel to corresponding extents. The digit bars by the relationship with the EM1 emitter are assigned digit values which are the tens complement of the amount entered in the accumulator, or the true number amount on the card. The readout is shown as to represent the amount of -9427- which is the tens complement of the amount -1683- entered in the accumulator. It should be noted on Fig. 11a that the digit bars 151 are reverse numbered and that brushes 153 travel over the bars in the order 0-9-8-7, etc. in the direction indicated by the arrow.

3. *Setting of grid readout*

It should be observed that for the grid readout No. 1 the contact fingers 127 contact digit bars 126 which represent the true number amount printed by the type bars and therefore in each of the denominational orders the digit position will be the digit of the amount on the card. The contact fingers 127 are shown in the wiring diagram of the grid readout to be at digit positions -9427- and in the drawings both the RO2 readout of the storage accumulator No. 1 and the grid readout RO1 have been shown as set to corresponding digit positions. While the true number positions of the RO1 readout and the tens complement digit positions of the storage accumulator are not actually compared, this makes little difference because it is actually through the brush settings of the readout RO2 of the storage accumulator No. 1 and the grid readout RO1 that a comparison is made to determine whether both have been set to positions corresponding to the amount derived from the card. In other words, the brush settings of the two readouts RO1 and RO2 are compared to determine whether there is actually a correspondence in settings and the manner in which this is done will now be explained in detail.

4. *Comparing circuits for detecting corresponding and non-corresponding positions of readouts RO1 and RO2*

After the type bars have been set up and the tens complement amount has been entered into storage accumulator No. 1 a comparison is made between RO1 and RO2 readouts by means of electrical comparing circuits, but prior to the transmission of comparing impulses cam 139 will be effective to rock the grid readout assembly downwardly so that the digit strips 126 will make contact with the contact fingers 127 according to the differential positions of the type bars, and certain strips 126 with contact fingers 140 (Fig. 7). Cam 139 is designed to retain this contacting relationship during the transmission of the comparing impulses.

In order to reduce the length of the comparing operation the comparing circuits have been so designed that by the adoption of a code a comparison for all digits 0-9 can be effected in six points of the cycle instead of ten points as would be the case if the conventional method of comparison was utilized.

The comparison of the amounts set up on the readout RO2 of the storage accumulator No. 1 and the grid readout RO1 is effected between 160 to 220° of the cycle as shown in the timing diagram, during which time the emitter EM1 will, in its second revolution beginning at 160°, transmit comparing impulses in the order 4, 3, 2, 1, 0, 5. The set of 4, 3, 2, 1, 0 contact points of EM1 emitter to be engaged during the first and second revolution beginning at 160° has wire connections 155 to the respective digit strips 4, 3, 2, 1, 0 of the grid readout RO1. The four denominational column strips or bars 124 of said grid readout have respective plug connections 156 in order that comparing impulses under control of RO1 are transmitted through the normally closed relay contacts 1—4 of the R42 relay to the pickup coils of the R1, R2, R3 and R4 comparing relays.

According to the digit positions 4, 3, 2, 1 and 0 of the RO1 readout the pickup coils of the R1, R2, R3 and R4 for the four comparing orders will be energized. Each relay will close its corresponding holding contact $h$ and a holding circuit will be maintained by a holding circuit from the line 144, through C4 cam contacts, the $h$ contact of any relay, the hold coil of any relay R1—R4 to the line side 145.

From the timing of the C4 cam contacts, it will be seen that each relay when energized by the 4, 3, 2, 1, 0 impulses will be held energized up to 208° of the cycle, thereby dropping out all of such energized relays preparatory to reinitiating the energization of such relays at 210° if necessary under control of the 5 component comparing impulse transmitted by the EM1 emitter.

The 4, 3, 2, 1 and 0 digit bars 126 of the RO1 readout are connected to corresponding digit bars 151 of the RO2 readout through intermediate wire connections and respective normally closed transfer contacts R46—4, 3, 2, 1 and 6. This connection is made in order that the 4, 3, 2, 1 and 0 comparing impulses transmitted by EM1 emitter are concurrently transmitted to both readouts.

The circuit for comparing 0 digit representations in RO1 and RO2 is slightly different from the other connecting circuits and extends from the 0 digit bar 126 of the RO1 readout, and wire 162 which incidentally connects the 0 bar with the 126B bar of the RO1 readout, thence through the R46—6 transfer contacts, wire 163 to the 0 digit bar 151 of the RO2 readout.

The comparing impulses are directed from the column strips 152 of the RO2 readout, through the normally closed 1, 2, 3, 4 transfer contacts of the R29 relay, plug sockets 156, one of the plug connections 157, plug sockets 158, thence through the normally closed transfer relay contacts 1—4 of the R41 relay, to the pickup coils of the other set of comparing relays R5, R6, R7, R8 to the line side 145. The pickup coils of this second set of comparing relays R5—R8 also close their respective $h$ holding contacts to pick up the corresponding H or hold coils which are held through the cam contacts C4, in exactly the same manner as described for the R1—R4 comparing relays. The two sets of R1—R4 and R5—R8 relays are paired through their comparing contacts in a comparing circuit network (Fig. 11b) in the following pairs: R1—R5; R2—R6; R3—R7; and R4—R8. If there is a corresponding digit position in both readouts the paired comparing relays in the corresponding column of the two readouts will be concurrently energized.

Each pair of comparing relays is adapted to close their respective "1" relay contacts which, as shown in Fig. 11b, are interconnected in a criss-cross circuit connection so that there is normally an open circuit between cam contacts P2 and the R21 relay. Upon the concurrent energization of a pair of relays, such as R1 and R5, the R1—1 and R5—1 relay contacts are concurrently transferred, thus maintaining the open circuit. However, if there is a dissimultaneous energization of a pair of relays, such as R1 and R5, one of said transfer contacts will be transferred before the other, thereby closing the circuit between P2 cam contacts and R21 relay. This is only generally described since it is a well known form of electrical comparing network in accounting machines. Concurrent energization of each pair of relays means an equivalence in digital settings of both readouts, whereas a dissimultaneous energization indicates that the digital setting in a particular order of one readout is different from the setting in the same order of the other readout. After each comparing impulse, so far explained for 4, 3, 2, 1 and 0, P2 cam contacts transmit an impulse through the comparing circuit network and energize the R21 relay upon a non-agreement in the digital settings of both readouts. If the R21 relay is energized it will close its $h$ contacts, thereby effecting a holding circuit through such contacts and the C14 cam contacts, which will hold the R21 relay energized until nearly the end of the cycle.

So far it has been explained how a successive comparison is made to determine like or unlike digital settings of 4, 3, 2, 1 and 0 in both readouts which takes five cycle points of the machine cycle. It will now be explained how the above impulses 1, 2, 3, 4 and 5 will concurrently effect in the same five cycle points digital comparisons in both readouts for 5, 6, 7, 8 and 9.

It should be noted that the digit bars 4, 3, 2, 1 and 0 of RO1 readout are interconnected with digit bars 9, 8, 7, 6 and 5 through five wire connections 160 and the respective 2, 3, 4, 5 and 1 transfer contacts of the R25 relay. This enables the circuit to be completed to the 4 digit bar of the RO1 readout simultaneously with the 9 digit bar; the 3 with the 8; 2 with the 7; 1 with the 6; and the 0 with the 5. It should also be noted that similar circuit connections are made between bars 4, 3, 2, 1 and 0 and respective bars 9, 8, 7, 6 and 5 in the RO2 readout due to the normally closed contacts 1—5 of the R26 relay. Both relays R25 and R26 are deenergized during the transmission of impulses 4, 3, 2, 1 and 0. This circuit arrangement makes it possible to make a concurrent comparison of two digits for each of the five impulses.

Therefore, for each order there is digit comparison in the following pairs:

4—9
3—8
2—7
1—6
0—5

If the digital settings in the same order of the two readouts do not consist of the above five pairs of digits then a difference in digit settings will be detected by the comparing relays and comparing circuit network just described.

However, if the digital setting in the same order of two readouts consists of any of the above pairs, that is to say, the RO1 readout represents 4 and the RO2 readout represents 9, this unequal digit representation will not be detected at this time.

In the above example a 4 impulse will energize the R1 relay associated with RO1 readout, and the same impulse will pass through the R46—4 relay contacts, R26—5 relay contacts, the "9" brush to the R5 relay. Thus, there is a disagreement in digit settings but the concurrent energization of R1 and R5 relays will indicate at this time an equivalency. This will also happen with the other pairs of digits listed above.

The transmission of the sixth impulse —5— for the detection of 5 components in both readouts will detect the inaccuracy of the temporarily assumed agreement. Before this impulse is transmitted, cam contacts C4 open to deenergize the two sets of comparing relays R1—R4, and R5—R8 if they have been energized. This detection is based upon the principle that for numbers above 4, that is, 5, 6, 7, 8 and 9, the digit 5 is five units of that number.

In the pairs of digits above listed this is not true of numbers in the left-hand column but is true of numbers in the right-hand column. Hence, means is provided to determine whether in the same order of the two readouts the digit settings have each the 5 component.

Just preceding the transmission of the 5 component impulse, C6 cam contacts close to energize, by an obvious circuit, the R25 and R26 relays. The R25 relay transfers its 1—5 relay contacts and R26 relay likewise transfers its relay contacts. The EM1 emitter will now have a circuit connection from its "5" contact point to the 5 digit bar 126 of RO1 readout, the wire connection therefrom to the R25—1 relay contacts to a wire 165. Hence, the 5 impulse is transmitted to the wire 165 and through the transferred R25—2, 3, 4, and 5 relay contacts of the R25 relay, this impulse is impressed concurrently upon the 6, 7, 8 and 9 digit bars 126 of the RO1 readout. This same impulse extends from the 5 digit bar 126 of the RO1 readout by a wire 166 to the R46—5 relay contacts now in normal position, to bus bar 167 so that in a like manner the 5 comparing impulse is impressed concurrently upon the 5, 6, 7, 8 and 9 digit bars of the RO2 readout. This single impulse is transmitted to determine whether in the same order of the two readouts there are incorrect digital settings according to the pairs of digits listed above, which were previously accepted as correct. Obviously, if in an order of the RO1 readout a 4 is standing thereon, and in the RO2 readout 9 is represented, only one comparing relay under control of the RO2 readout will be energized and none under control of the RO1 readout because the 5 impulse is not transmitted to the digit bars 4, 3, 2 and 1. Dissimultaneous energization of paired comparing relays will cause the energization of the R21 relay, now indicating a disagreement. It should be noted that when the comparing relay is energized by the 5 component impulse and under the preceding conditions the C5 cam contacts extend and complete the holding circuit therefor.

Thus, it is evident that the two sets of comparing relays are utilized twice in the readout comparing part of the cycle. The first comparison is effected by transmission of the 4, 3, 2, 1 and 0 impulses and the second comparison is initiated by the 5 component impulse, made solely to distinguish between inaccuracies in certain settings of two brushes of the same order in the two readouts which were previously accepted in the first comparison as correct.

After the aforesaid two comparing operations have been completed and the R21 relay has not been energized because an agreement has been detected, a circuit is closed from the line side 144 through cam contacts C7, CLc card lever contacts, the R21—2 relay contacts, the aforementioned printing hammer control magnet 89 (see also Fig. 2), to line side 145. The energization of this magnet enables normal operation of the printing hammers and printing will be effected from the type bars at their digit positions because it has been ascertained that the RO1 and RO2 readouts are at corresponding digit positions.

If the R21 relay is energized, when a disagreement is detected, print control magnet 89 will be energized and this will prevent release of the printing hammers. The card, nevertheless, passes through without receiving an imprint, and successive cards are fed without interrupting the operation of the machine, until all cards of a run have passed through the machine.

5. *Entry in summary accumulator No. 2 when both readouts are at corresponding digit positions*

When the amounts represented on readouts RO1 and RO2 are found to correspond the R21 relay will not be energized. Normal position of the relay R21 contacts will not only allow printing of the amount on the card but will also allow the entry of this amount into the summary accumulator No. 2 under control of the RO2 readout.

When cam contacts C7 close a circuit is completed from line side 144 through R43—3 transfer contacts now in normal position, R21—3 relay contacts now in normal position, the R32 transfer relay, to line side 145. The R32 relay transfers its 1, 2, 3, 4 transfer contacts to cause digit impulses to be transmitted to the AM start magnets of summary accumulator No. 2 under control of the RO2 readout. The entry effecting digital impulses are transmitted over the second set of contact spots in the second revolution of the EM1 emitter between 230 and 290° of the machine cycle during which time the R32 transfer relay is held energized by the C7 cam contacts if an entry operation is to be effected. The EM1 emitter will transmit impulses in the order 4, 3, 2, 1, 0 and 5 and impulses 4, 3, 2, 1 and 0 will pass through the 4, 3, 2, 1 and 0 digit bars 126 of the RO1 readout, thence through respective connecting wires, through the associated transfer contacts R46—4, 3, 2, 1, 6 and to the corresponding digit bars 4, 3, 2, 1 and 0 of the RO2 readout.

According to the digit representations 4, 3, 2 and 1, differentially timed impulses are transmitted which, as shown in the timing diagram, effect the clutching of the accumulator element four steps to enter a 4; three steps to enter 3 (since the 3 impulse follows at a later time); and so on; two steps to enter a 2 and one step to enter a 1. Clutching of the accumulator element is caused in each order by transmitting such differentially timed impulses selected by the RO2 readout to the AM start magnet by the following circuit connections: From the column bars 152 of RO2 readout, wires 170, through the R32, 1, 2, 3, and 4 transfer contacts, through the R47—1, 2, 3 and 4, units carry relay R47 contacts now in normal position, the AM start magnets of accumulator No. 2 to the line side 145.

Termination of such digit entries 4, 3, 2 and 1 is caused by the transmission of a second stop impulse by C16 cam contacts which occurs at 270° of the machine cycle. This second stop impulse will concurrently energize the SM stop magnets for storage accumulator No. 2. EM1 emitter will also transmit a 0 impulse but it will have no significance since, if any brush in the RO2 readout stands at 0, it will be transmitted to the AM stop magnet of that order at the same time that the stop impulse is transmitted to the SM stop magnet of the same order. The accumulator wheel will remain declutched so that no entry can be effected by the transmission of the 0 impulse.

When a readout order of RO2 represents 5, 6, 7, 8 and 9 there is also an entry of an extra 5 unit. Therefore, for those orders wherein the brush 153 had been standing upon the digit segments 5, 6, 7, 8 and 9, a digit entry of 5 will be effected by the following described circuit:

The 5 impulse from the EM1 emitter passes through the 5 digit bar 126 of RO1 readout, wire 160, R46—5 transfer contacts now in normal position, to the bus bar 167, thereby impressing this 5 impulse concurrently on the digit bar 5 of RO2 readout, since R26 relay is energized, at the time of the transmission of this impulse. Referring to the wiring diagram, cam contacts C6 close a second time at about 275° to again pick up the R26 relay. This 5 start impulse will be directed to AM start magnets in each order where there had been a setting of 5–9 in the RO2 readout and the accumulator wheel will turn five steps until its rotation is terminated by the third stop impulse transmitted to SM magnets at 350° by the C16 cam contacts. Since the RO2 device is concurrently being reset, as will later be described, all brushes 153 will be at the 0 or 5 digit bars when this 5 impulse is transmitted.

Obviously, where a digit amount, such as 6, 7, 8 and 9 is represented in any order of the readout, two entries are made; one of 1, 2, 3 and 4 steps and also one of five units. This is due to the fact that the digit bars 4, 3, 2 and 1 are, during transmission of impulses, multipled through the R36—5, 4, 3 and 2 relay contacts with the 9, 8, 7, and 6 digit bars 151 of the RO2 readout. Therefore, in corresponding orders of the accumulator there will be a first digit entry of 4, 3, 2 or 1 and a second digit entry of 5, for values 9, 8, 7 and 6, respectively. A five setting results in transmission of second impulse only.

It is explained, as shown in the timing diagram, that after the RO1 readout has been used for the comparison and entry determining operations that the type bars and readout fingers 127 are now free to be returned to normal position, which operation begins, as shown in the timing diagram, at 262°. This operation overlaps part of the time that the digit entries are made into the summary accumulator, thereby saving time which would be wasted in the machine cycle if such operation did not overlap and enabling the machine to operate at a higher speed.

6. *Means to prevent accumulator entry operations when the amounts on RO1 and RO2 readouts are ascertained to be unlike*

The above operation is, of course, controlled by the R32 transfer relay. Upon a disagreement the R21—3 contacts are transferred, thereby opening the circuit to the R32 transfer relay when C7 cam contacts close. Since transfer contacts R32—1, 2, 3, 4 will remain at normal the RO2 readout will not be connected to the AM start magnets of summary accumulator No. 2 so that no entry will be effected. It will also be recalled that upon a disagreement the hammer control magnet 80 will not be energized and it will suppress printing operations. Hence, upon a disagreement both amount printing and entering will be prevented.

UNITS CARRY CIRCUIT

Since accumulator No. 2 is a summary accumulator it is provided with the conventional units carry circuits controlled by the carry contacts 141, 142 and 143 shown in Fig. 6. Such units carry circuits controlled by the accumulator wheels are well known. The carry circuits are operative at the time cam contacts C12 energize the R47 relay. The energizing circuit is from the line side 144, through C12 cam contacts, R43—5 relay contacts now closed, R47 carry relay, to the line side 145.

Referring to Fig. 11a the carry impulse is transmitted by a circuit from the line side 144 through P1 contacts, wire 172, cam contacts C10, thence through the "10" transfer contacts previously closed by the wheel of the units order, for example, thence through the R47—3 relay contacts now transferred, to the start magnet AM of the tens order, to line side 145. The fourth stop impulse from C16 directed at 350° to the SM stop magnets terminates the units carry in each order where a carry is made. Carries by carries are effected to each higher order through the 9 transfer contacts in the well known manner, if the next higher order wheel should be standing at 9 and a units carry was made into this order.

7. *Resetting storage accumulator No. 1*

It is, of course, necessary to condition the machine for the next machine operation by resetting the wheels of the accumulator No. 1 and associated RO2 readout after the transfer of an amount into summary accumulator No. 2.

The same single or combinations of impulses which are directed to the AM magnets of summary accumulator No. 2 under control of the RO2 readout to transfer the amount to summary accumulator No. 2 are also concurrently transmitted to the AM start magnets of storage accumulator No. 1 and each accumulator wheel of accumulator No. will be rotated by an amount equal to the original hole spaced in the card, advancing each wheel to 0 digit position at which time an impulse is directed by C16 cam contacts to each of the stop magnets SM of storage accumulator No. 1 to terminate the rotation of the wheel at zero. Use of the same impulse for transfer to accumulator No. 2 and reset of accumulator No. 1 is made possible only by reason of the initial entry into accumulator No. 1, storage having been made in tens complement form as described and as will be noted by the chart in the upper left corner of Fig. 10a.

Transmission of impulses under control of the setting of the brushes of the RO2 readout to the AM start magnets is controlled by the 1, 2, 3, 4 relay contacts of the R29 relay which is held energized during a reset operation by the following circuit: line side 144, C7 cam contacts, R45—1 transfer contacts now in normal position, the R29 relay coil, to line side 145. Selected impulses transmitted by the EM1 emitter will also be directed through the 1, 2, 3 and 4 transferred contacts of the R29 relay and the 1, 2, 3 and 4 relay contacts of the R12 relay which are now normal, to each of the AM magnets to line side 145. It will be recalled that the storage accumulator wheels were initially set to represent the tens complement of the amount on the card, since accumulator No 1 was previously cleared. Obviously, if the RO2 readout represents, by assigned digital values, the true digit of the amount on the card their addition to the tens complement amount standing on the wheels of storage accumulator will bring them each to 0 position. Energization of the SM stop magnets declutches the accumulator wheels of storage accumulator No. 1 to retain them in 0 digit position, and this is effected by the second and third step impulses transmitted to the stop magnets SM of storage accumulator No. 1 after the entry of the digits 4, 3, 2 and 1 and also after the entry of the digit 5.

Actual resetting of the accumulator is accomplished in one or two steps, depending on the amount that the counter wheel must be advanced to bring it to a 0 position. One step is required to move the wheels 4, 3, 2 or 1 positions to bring all wheels to 0 or 5. Another step is necessary for all wheels standing at 5 to advance them to 0.

*8. Total printing from summary accumulator No. 2*

Up to the present point of the description it is understood that a series of cards is passed through the machine and the setting of the type bars is, through storage accumulator No. 1, compared with the setting of the type bars under control of the digit representing perforations of each card. If an error has been ascertained the amount is not entered in the accumulator but whether or not the comparing means locates an agreement or disagreement, the cards are passed uninterruptedly through the machine. The amounts of such cards are known to the operator to be a precomputed total and discernment of an error in the run of cards is ascertained by comparison of the total in the summary accumulator No. 2 with this precomputed total. This will be an indication to the operator that unprinted cards have passed through the machine which are incorrect. At the end of each series of perforated cards a special total taking initiating card is passed through. Such card is imperforate in the fields which previously controlled the printing mechanism and by means of a perforation at the X position of a selected column the machine is conditioned to take a total from the summary accumulator No. 2 and set up the type bars to effect the printing of the total on such total card.

When such card with a perforation at the X position passes through the machine, a circuit is completed from the plug socket 146X of the brush in the column in which such X perforation appears, and by means of a plug connection 180 therefrom to a plug socket 181, a circuit will be completed through cam contacts C3 which are timed to close at the time the X perforation is sensed, to the pickup coil of the R43 relay to the line side 145. The pickup coil closes contacts R43—1 which effects a holding circuit for the R43H relay coil, through such relay contacts and the C11 cam contacts. C11 cam contacts maintain the R43 relay energized until the end of the cycle. R43 relay opens interlock contacts R43—5 in the energizing circuit of the R47 carry relay to prevent improper carry operations. R43 relay coil also transfers the R43—2 relay contacts, completing a circuit from the line side 144, through cam contacts C2, contact CLb, R43—2 relay contacts, R35 relay coil to the line side 145. R35 relay is the total readout relay which transfers its R35—1, 2, 3, 4 relay contacts, thereby establishing a connection between the RO3 readout and the print magnets 58 which are energized to set up the print bars to represent the total on the readout. Current is supplied to EM2 emitter by a circuit from line side 144, P1 circuit breaker contacts, C1 cam contacts, C1a card lever contacts, wire 189, R43—7 relay contacts, to the brush of emitter EM2.

The C1 cam contacts are closed between 0 and 120° of the cycle during which time the EM2 emitter during its first revolution in the cycle transmits digit impulses in the order 1, 2, 3, 4 ... 9. From the timing diagram it will be seen that these impulses are coincident with the digit impulses derived from the brushes when a perforated card is passed through the machine. According to the digit representation on the RO3 readout selected digit impulses are transmitted to the print magnets 58 to set up the print bars exactly as the card perforations do.

The summary accumulator No. 2 is provided with a conventional readout RO3 consisting of digit bars 191 representing 0, 1, 2, 3 ... 9, column contact bars 192 and settable brushes 193 each of which, as is well known, bridges a column contact bar and a digit bar, depending upon the differential digit displacement of the brush 193. For convenience and simplicity only four column bars 192 are shown but actually a much larger number would be used to take care of the required accumulating capacity of the summary accumulator No. 2. The EM2 emitter is associated with digit bars 191 to transmit digit impulses in the early part of the cycle between 30–120°. The digit impulses pass through the column bars 192 and the transfer relay contacts 1, 2, 3, 4 of the R35 relay, and as shown for one column, are directed through a plug connection 194 to plug socket 150 of the print control magnet 58 to the line side 145. Thus, the print bars are set up to print the total on the horizontal edge of the total card passing through the machine and in the same manner as if a perforated card passed through the machine. A rectifier of the dry disk type is connected between the 5 digit bar of RO3 and the R27—1 contact to prevent an unwanted circuit from the 5 spot on the EM2 to the 0 digit bar of RO3.

Since the type bars are set up to represent the total, the RO1 readout is also set up, thereby to represent the total to be printed and it is desirable that before taking an imprint from the differentially set type bars the digit representations on the RO3 readout be compared with the digit representations on the RO1 readout set up under control of the type bars. With some minor exceptions this is performed in substantially the same manner as the comparing operation between the RO1 readout and the RO2 readout of the storage accumulator No. 1.

*9. Comparing circuits for detecting corresponding and non-corresponding positions of readouts RO1 and RO3*

This comparing operation takes place between 160–214° of the cycle and the impulses directed during this time by EM1 emitter during its second revolution in the cycle are used for comparison purposes. In the manner previously explained impulses under control of RO1 readout are sent to the pickup coils of the R1, 2, 3, 4 comparing relays as before and such impulses pass from the column bars 124 of RO1 readout, through plug connections 198 (only one being shown for simplicity), thence through the transferred contacts 1, 2, 3 and 4 of the R42 relay to the first set of comparing relays R1, 2, 3 and 4. R42 relay is energized during the transmission of comparing impulses by a circuit from the line side 144, through C15 cam contacts R43—6 relay contacts now closed, to the R38, R41 and R42 relays in multiple, to the line side 145. R38 and R41 relays are the instrumentalities for directing impulses from the RO3 readout to the second set of comparing relays R5, 6, 7 and 8. Impulses under control of RO3 readout are transmitted from the column contact bars 192 through the R35—1, 2, 3 and 4 relay contacts now in normal position, thence through the R38—1, 2, 3 and 4 relay contacts now in transferred position, to plug sockets 195. These impulses then pass from such plug sockets over a plug connection 196 for each order to a plug socket 197, thence through contacts of the relay R41 to the related comparing control relay R5, 6, 7 and 8. The same comparing circuit previously described is operative to determine whether or not the RO1 and RO3 readouts are at identical digit representing positions.

These readouts are compared by the use of only six comparing impulses due to the concurrent comparison of two sets of digit bars in both readouts and the utilization of the 5 component test impulse, as has been described. It will be recalled that this 5 component impulse is directed under control of the R25 relay for the RO1 readout and for the RO3 readout it is directed as a result of the energization of the R27 relay, the energizing circuit therefor being the same as for the R25 relay because the R27 relay is in multiple circuit connection therewith. The "5" component test operation is substantially the same as previously described except that it will be noted that in the RO3 readout the two sets of digit bars are paired through respective transfer contacts 1—8 of the R50 relay which is deenergized during the comparing operation. For example, the 0 digit bar 191 is normally interconnected through the R27—1 contacts now in normal position with the 5 digit bar. The 1 digit bar is paired with the 6 digit bar through the R50—8 transfer contacts, the R27—2 transfer contacts, and the R50—4 relay contacts. Similar circuits can be traced for interconnecting the 2 digit bar with the 7 digit bar; the 3 with the 8; and the 4 with the 9.

While this is of particular advantage during comparing operations, the specific circuit connections would tend to prevent improper operations during the setting up of the type bars. For example, if it is assumed that 1 is represented in the highest order of the RO3 readout, an improper circuit would be directed from the "1" digit bar through the R27—2 transfer contacts as they are now in normal position, thence through the R50—4 contacts now closed, thence through the 6 digit bar, and if a brush 193 was standing at 6 in any other order an improper impulse would be transmitted after the "1" impulse time to a print control magnet 58 and thus improperly print a digit of the total. To prevent this operation the R27 relay is energized via a circuit extending from the line side 144 through C13 cam contacts, R43—4 relay contacts now closed, R27 relay to line side 144. This transfers the R27—1—5 relay contacts to prevent the transmission of erroneous impulses. After transmission of the 4 impulse by EM1 emitter R27 relay deenergizes to enable the transmission of the impulses 5—9 to the print control magnets 58 if there are digit representations 5—9 on the RO3 readout.

It will be recalled that if the comparing circuit network locates a disagreement, and herein between the RO and RO3 readouts, the R21 relay coil will be picked up which will open the R21—2 relay contacts to prevent energization of the printing hammer release magnet 89; therefore upon a disagreement printing will not be effected upon the total card and it will pass unprinted through the machine.

When an agreement has been found between RO1 and RO3 reset circuits are then effective to reset the summary accumulator No. 2 but if a disagreement has been found the reset circuits are ineffective so that a following X-punched total card may pass through the machine to repeat the total taking and printing operation. In other words, the summary accumulator No. 2 will never be reset until there is an agreement between the setting of the type bars and the RO3 readout of the accumulator No. 2.

10. *Reset of summary accumulator No. 2*

When it has been ascertained that the readouts RO1 and RO3 have like digit representations summary accumulator No. 2 is reset and this is performed by entering the tens complement of the digit representation on the RO3 readout into the summary accumulator No. 2 to bring each order to 0. In the drawings RO3 readout has been shown set to represent 9863. Thus, 1247 will be entered into the accumulator and all orders will be brought to 0, it being recalled that at this time the units carry relay R47 will not be energized so as to avoid improper units carry operations in this accumulator.

The reset digits are entered singly or in combination, that is, the entry of the digits 1, 2, 3, 4 alone or such digits in combination with 5, as well as the entry of 5 alone. The operation is substantially the same as that previously described for resetting storage accumulator No. 1 except that in the instant operation of the machine a conversion relay R50 is energized so as to establish a relationship between the EM1 emitter and the RO3 readout in such manner that tens complement digit impulses are sent to the AM magnets of accumulator No. 2.

The reset impulses are transmitted by the EM1 emitter between 230 and 290° of the machine cycle and to direct such impulses to the digit segments of the RO3 accumulator a relay R46 is energized to close its 1, 2, 3, 4, 5 and 6 contacts. It will be seen that the closure of these contacts will tend to connect like digit bars 5, 4, 3, 2, 1 and 0 of the RO1 and the RO3 readouts but the energization of the R50 relay changes this relationship so as to cause the entry of the tens complement digit. The R46 relay is energized during the reset part of the cycle because it is in multiple circuit connection with the R43 relay. The R50 relay is energized by the C7 cam contacts during the reset part of the cycle by a circuit which extends from the line side 144, C7 cam contacts, R45—1 contacts now in transferred position to the R50 relay. This relay transfers its 1—8 relay contacts.

As previously intimated, combinations of digits are entered in the accumulator which comprises the digits 1, 2, 3 and 4 in combination with the 5 digit. This 5 digit entry is effected by applying the 5 component impulse to the 9, 8, 7, 6 and 5 digit bars of the RO2 readout but due to the tens complementary digit entries in the RO3 readout this 5 component impulse is transmitted by application of this impulse to the digit bars of 1, 2, 3, 4 and 5 of the RO3 readout, which is just the reverse. This is effected for resetting operations as a result of the energization of the R50 relay and its transferred contacts. The transmission of the reset impulses will best be understood by the following table:

| Reset Impulse | through | to Digit Segments | Effects Reset Digit Entry of— |
|---|---|---|---|
| 4 | R46-4 | 1 / 6 | 4+5 / 4 |
| 3 | R46-3 | 2 / 7 | 3+5 / 3 |
| 2 | R46-2 | 3 / 8 | 2+5 / 2 |
| 1 | R46-1 | 4 / 9 | 1+5 / 1 |
| 0 | R46-6 | 0 | Ineffective |
| 5 | R46-5 | 5 | 5 |

From the preceding table it will be seen that the 4 reset impulse passes through the R46—4 relay contacts and is applied concurrently to the 1 digit bar and the 6 digit bar, the circuit to the 1 digit bar being completed through the normally closed 5 contact of relay 27 and thence through the shifted 1 contacts of relay R59. The circuit to the 6 digit bar is through shifted 5 contacts of R50. If the brush stands on the digit bar 6 the 4 impulse will enable, according to the timing diagram, the transmission of an impulse to the AM start magnet to enter a tens complement digit 4. So also if the digit representation is 1 but later on the energization of the R27 relay is effected in the same manner as previously described, that is, by cam contacts C6, EM1 will send the 5 component impulse to the start magnet of the same order which, as shown in the timing diagram, will then effect the entry of the digit 5. Thus, for digit representations 1 and 6 the tens complement entry 9 and 4 are respectively made. The tens complement digit entry for other numbers can be worked out according to the preceding table wherein it will be seen that in each case a tens complement digit will be entered to bring each order to a 0 representation. It should be noted that at 280° all wheels will stand at 0 or 5, and that at 280° an impulse to the 5 digit bar will complete the reset. Of course, the stop magnets SM of the storage accumulator are also energized by the C16 cam contacts to terminate each entry.

11. *Means to prevent resetting of summary accumulator No. 2 in event of an error*

It should be noted that the impulses directed to the AM start magnets of the summary accumulator pass through the transfer contacts R35—1—4 now normal, the R38 transfer contacts 1—4 now normal and the R32 transfer contacts 1—4 now normal. However, in the event of an error the R21 relay is energized to transfer the R21—3 contacts so that when C7 cam contacts close a circuit is closed from line side 144 through C7 cam contacts, R43—3 contacts now transferred, through the R21—3 contacts now transferred, to the R32 relay. R32 relay then transfers its 1—4 transfer contacts so as to prevent transmission of reset impulses to the AM start magnets whenever a disagreement between the RO1 and RO3 readouts has previously been ascertained.

Summarizing, the summary accumulator No. 2 will never be reset to zero until the type bars are correctly positioned to reflect the digit representations of RO3 readout.

While there have been shown and described and pointed out the fundamental novel features of the invention, it will be understood that various omissions and substitutions and changes in the form and details of the device illustrated and in its operation may be made by those skilled in the art without departing from the spirit of the invention. It is the intention, therefore, to be limited only as indicated by the scope of the following claims.

What is claimed is:

1. In a machine of the class described, the combination of an accumulator, an entry means therefor, a set of type bars, type bar positioning means, digit storage means including digit readout means positioned thereby, means for reading out said readout means twice, once for determining its digit position, and second for controlling said accumulator entry means, digit storage setup means, means for analyzing a record representing a value, means under control of said analyzing means to control said type bar positioning means to effect a differential positioning of the type bars to select type for printing the value, means under control of said analyzing means to control said digit storage setup means to set up said digit storage means to represent by its readout means the value represented on the record, comparing means controlled by said readout means when it is first read out and said set of type bars for comparing the digit position of each type bar with the digit position of the readout means of the same order, and means controlled by said comparing means to render said readout means effective when it is read out the second time for causing an accumulator entry when the digit readout means and type bars have corresponding digit positions, and said readout means ineffective for an accumulator entry when the digit readout means and the set of type bars have non-corresponding digit positions in any order.

2. In a machine of the class described, the combination of an accumulator, an entry means therefor comprising for each order means to start an operation of the accumulator element, and means to stop an operation of the accumulator element, a set of type bars, type bar positioning means, digit storage means including a digit readout means positioned thereby to represent any of the digit positions 0-9, means for reading out said readout means twice, once for determining its digit position, and second for controlling said accumulator entry means to enter an amount in said accumulator, start and stop means for each order of said storage means, means for analyzing a record representing a value, means under control of said analyzing means to control said type bar positioning means to effect a differential positioning of the type bars to select type for printing the value, means under control of said analyzing means to cause the operation of the start means of said digit storage setup means to cause said digit storage means to set up its readout means, means to effect the operation of said stop means for each order of said digit storage means, comparing means controlled by said readout means when it is first read out and said set of type bars for comparing the digit position of each type bar with the digit position of the readout means of the same order, means under control of said readout means when it is read out the second time to effect the operation of the start means of said accumulator, means to effect the operation of the stop means for each order of the accumulator, means controlled by said comparing means to render said two preceding means effective for causing an accumulator entry when the digit readout means and type bars have corresponding digit positions and ineffective to thereby prevent an accumulator entry when the digit readout means and the set of type bars have non-corresponding digit positions in any order, means under control of said readout means when it is read a second time to effect the operation of the start means of said storage means to effect a complement entry therein to restore said storage means to zero, and means to effect the operation of the stop means of the storage means when each order is at zero.

3. In a machine of the class described, the combination of an accumulator, an entry means therefor comprising start and stop means for each order thereof, digit storage means including a digit readout means positioned thereby to represent any of the digit positions 0–9, means for reading out said readout means, digit storage setup means comprising start means and stop means for each order of said storage means, means for analyzing a record representing a value, means under control of said analyzing means to control the start means of said digit storage setup means to cause said digit readout means to represent the value on the record, means to effect an operation of the stop means for each order of said storage means, means to effect the operation of said reading-out means to cause, under control of said readout means, the operation of the start means for said accumulator according to the digit positions of the readout means to thereby transfer an amount from the storage means to said accumulator, and means for effecting an operation of the stop means for said accumulator.

4. In a machine of the class described, the combination of an accumulator, an entry means therefor, a set of type bars, type bar positioning means, digit storage means including digit readout means positioned thereby to represent any of the digit positions 0–9, means for reading out said readout means twice, once for determining its digit position, and second for controlling said accumulator entry means, digit storage setup means, means for analyzing a record representing a value, means under control of said analyzing means to control said type bar positioning means to effect a differential positioning of the type bars to select type for printing the value, means under control of said analyzing means to control said digit storage setup means to cause the latter to represent by its readout means the value represented on the record, contacts closed by each type bar at its digit position, a plurality of A relays energized by the corresponding type bar contacts, a plurality of B relays energized under control of said readout means, means under control of said readout means when it is first read out to energize said B relays at differential times corresponding to the differential times said A relays are energized, a comparing circuit network controlled by said A and B relays for determining when corresponding A and B relays in each order are energized at corresponding or non-corresponding times, and means controlled by said comparing circuit network to cause said readout means to be effective to control the accumulator entry means when corresponding A and B relays in each order are energized at corresponding times due to corresponding digit positions of the type bars and readout means, and to render said readout means ineffective to control an accumulator entry when corresponding A and B relays in any order are energized at different times due to non-corresponding digit positions of the type bars and the readout means.

5. In a record controlled machine through which a run of cards perforated to represent amounts is passed and which are known to total a precomputed control total, the combination of an accumulator, record analyzing means, a printing mechanism, means to effect printing impressions from said printing mechanism upon said records, means under control of said analyzing means to set said printing mechanism to represent an amount, verifying and checking means controlled by said analyzing means and said printing mechanism to determine whether said printing mechanism has been set to agree or disagree with the amount represented by the perforations on each record, means controlled by said verifying and checking mechanism to prevent the operation of said impression effecting means when a disagreement has been detected while passing the unprinted record uninterruptedly and completely through the machine, and means controlled by said verifying and checking mechanism to effect an entry in said accumulator when an agreement has been detected, and to prevent an entry when a disagreement has been detected, whereby at the end of a run the records accompanied by an incorrect setting of the printing mechanism will not be printed and their amounts will not be entered in said accumulator, and the latter will not have a total amount which agrees with the precomputed control total.

6. In a record controlled machine through which a run of cards perforated to represent amounts is passed and which are known to total a precomputed control total, the combination of an accumulator, record analyzing means, a printing mechanism, amount storage means, means to effect printing impressions from said printing mechanism upon said records, means under control of said analyzing means to concurrently set said amount storage means and said printing mechanism to represent an amount, verifying and checking means controlled by said amount storage means and said printing mechanism to determine whether said printing mechanism has been set to agree or disagree with the amount represented by the perforations on each record, means controlled by said verifying and checking mechanism to prevent the operation of said impression effecting means when a disagreement has been detected while passing the unprinted record uninterruptedly through the machine, and means controlled by said verifying and checking mechanism to effect an entry in said accumulator when an agreement has been detected, and to prevent an entry when a disagreement has been detected, whereby at the end of a run the records accompanied by an incorrect setting of the printing mechanism will not be printed and their amounts will not be entered in said accumulator and the latter will not represent the precomputed control total.

7. In a record controlled machine through which a run of records perforated to represent amounts is passed and which are known to total a precomputed control total, the combination of an accumulator, record analyzing means, printing mechanism, means to effect printing impressions from said printing mechanism, means under control of said analyzing means to set said printing mechanism to represent an amount, verifying and checking means controlled by said analyzing means and said printing mechanism to determine whether said printing mechanism has been set to agree or disagree with the amount represented by the perforations on each record, means controlled by said verifying and checking mechanism to prevent the operation of said impression effecting means when a disagreement has been detected while passing the unprinted record uninterruptedly and completely through the machine, means controlled by said verifying and checking mechanism to effect an entry in said accumulator when an agreement has been detected, and to prevent an entry when a disagreement has been detected, whereby at the end of a run records accompanied by an incorrect setting of the printing mechanism will not have their amounts printed and entered in said accumulator, and means operative at the termination of the run of records to automatically take a total from said accumulator and print said total to enable a mental comparison of said printed total with the precomputed control total.

8. In a record controlled machine through which a run of records perforated to represent amounts is passed and which are known to total a precomputed control total, the combination of an accumulator, record analyzing means, printing mechanism, means to effect printing impressions from said printing mechanism to print the amount represented by the record on the record itself, means under control of said analyzing means to set said printing mechanism to represent an amount, verifying and checking means controlled by said analyzing means and said printing mechanism to determine whether said printing mechanism has been set to agree or disagree with the amount represented by the perforations on each record, means controlled by said verifying and checking mechanism to prevent the operation of said impression effecting means when a disagreement has been detected while passing the unprinted record uninterruptedly through the machine, means controlled by said verifying and checking mechanism to effect an entry in said accumulator when an agreement has been detected, and to prevent an accumulator entry when a disagreement has been detected, whereby at the end of a run the records accompanied by an incorrect setting of the printing mechanism will not be printed and their amounts will not be entered in said accumulator, and means operative at the termination of the run of records to take a total from said accumulator and print said total to enable a mental comparison of said printed total amount with the precomputed control total.

9. In a record controlled machine through which a run of cards perforated to represent amounts is passed and which are known to total a precomputed control total, the combination of an accumulator, record analyzing means, a printing mechanism, means to effect printing impressions from said printing mechanism upon said records, amount storage means, means under control of said analyzing means to concurrently set said printing mechanism and said amount storage means to represent an amount, verifying and checking means controlled by said amount storage means and said printing mechanism to determine whether said printing mechanism has been set to agree or disagree with the amount represented by the amount storage means, means controlled by said verifying and checking mechanism to prevent the operation of said impression effecting means when a disagreement has been detected while passing the unprinted record completely through the machine, means controlled by said verifying and checking mechanism to effect, under control of said amount storage means, an entry in said accumulator when an agreement has been detected, and to prevent an entry when a disagreement has been detected, whereby at the end of a run records accompanied by an incorrect setting of the printing mechanism will have passed through the machine unprinted and their amounts will not be entered in said accumulator, means operative at the termination of the record run to set said printing mechanism under control of said accumulator, means for comparing the amount on said accumulator with the setting of said printing mechanism, and means under control of said comparing means to cause an operation of said impression effecting means when a like amount representation has been detected for printing said total to enable a comparison of said printed total with the precomputed control total.

10. In a machine for comparing two digit representations of two interconnected digit representing means, contacts settable in each digit representing means to represent a particular digit 0–9 inclusive, means to transmit a series of digit test impulses to said settable contacts, means to interconnect said digit representing means to cause the transmission of five of said test impulses in succession to said settable contacts to determine whether the contacts in both digit representing means are both set to represent 0, 1, 2, 3 or 4 and concurrently to determine by the same five digit test impulses whether the contacts in both digit representing means are both set to represent 5, 6, 7, 8 and 9, and means to transmit a sixth test impulse concurrently to both digit representing means to test the setting of two contacts in both digit representing means to determine whether both are set to represent any of the digits 5, 6, 7, 8 or 9.

11. In a machine for comparing two readouts, each of said readouts comprising a series of digit contacts divided into groups and a device settable thereon according to the digit representation of each readout, means for transmitting a series of test impulses in succession to one group of digit contacts of one readout and concurrently to the corresponding group of digit contacts of the other readout to test corresponding settings of the respective settable devices on these groups of digit contacts, interconnecting wiring in each readout between said one group of contacts and the other group of contacts in the same readout to test by said series of test impulses corresponding setting of the respective settable devices on said other group of contacts, and means to transmit another test impulse concurrently to the same group of digit contacts in both readouts to determine whether the settable devices in both readouts have each been set on one of said same group of digit contacts.

12. In a machine for comparing two readouts, each of said readouts comprising a series of ten digit contacts 0—9 divided into groups and a device settable thereon according to the digit representation of each readout, means for transmitting five test impulses in succession to one group of digit contacts 4, 3, 2, 1, 0 of one readout and concurrently to the corresponding group of digit contacts of the other readout to test corresponding settings of the respective settable devices on digit contacts 4, 3, 2, 1 and 0, interconnecting wiring in each readout between said one group of contacts and the other group of contacts in the same readout to test by said five test impulses corresponding setting of the respective settable devices on digit contacts 5, 6, 7, 8 and 9 in both readouts, and means to transmit a sixth test impulse concurrently to the digit contacts 5, 6, 7, 8 and 9 in each readout to determine whether the settable devices in both readouts have both been set on one of the latter digit contacts.

13. In a machine for comparing two readouts, each of said readouts comprising a series of digit contacts divided into groups and a device settable thereon according to the digit representation of each readout, means for transmitting a series of test impulses in succession to one group of digit contacts of one readout and concurrently to the corresponding group of digit contacts of the other readout to test corresponding setting of the respective devices of these groups of contacts in both readouts, electrical connections in each readout normally connecting said one group of contacts with the other of contacts in the same readout to test corresponding settings of the respective devices on said other pair of contacts in both readouts, means to transmit a supplemental test impulse concurrently to the same group of digit contacts in both readouts to determine whether the settable devices in both readouts have been set on one of said same group of digit contacts, and means to disable said electrical connections in each readout before transmitting said supplemental test impulse.

GEORGE F. DALY.
CLARENCE R. MANNING.

REFERENCES CITED

The following references are of record in the file of this patent:

UNITED STATES PATENTS

| Number | Name | Date |
|---|---|---|
| 2,343,398 | Bryce | Mar. 7, 1944 |